(12) United States Patent
Pratt et al.

(10) Patent No.: US 10,270,547 B2
(45) Date of Patent: Apr. 23, 2019

(54) METHOD AND APPARATUS FOR SINUSOID DETECTION

(71) Applicant: University of Notre Dame du Lac, South Bend, IN (US)

(72) Inventors: Thomas G. Pratt, Niles, MI (US); Farzad Talebi, Mishawaka, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 15/069,819

(22) Filed: Mar. 14, 2016

(65) Prior Publication Data
US 2016/0277132 A1 Sep. 22, 2016

Related U.S. Application Data

(60) Provisional application No. 62/307,998, filed on Mar. 14, 2016, provisional application No. 62/132,162, filed on Mar. 12, 2015.

(51) Int. Cl.
*H04B 17/373* (2015.01)
*H04B 7/04* (2017.01)
(Continued)

(52) U.S. Cl.
CPC ......... *H04B 17/373* (2015.01); *H04B 7/0413* (2013.01); *H04B 7/10* (2013.01);
(Continued)

(58) Field of Classification Search
CPC ............... H04L 1/0041; H04L 25/0204; H04L 27/2621; H04L 27/2654; H04L 27/2672; H04L 27/2676; H04B 7/0626
See application file for complete search history.

(56) References Cited

U.S. PATENT DOCUMENTS

| 9,325,436 | B2 | 4/2016 | Pratt et al. | |
| 2003/0114164 | A1* | 6/2003 | Thomas | H04L 25/0204 455/452.1 |
| 2013/0322584 | A1* | 12/2013 | Kumar | H04L 27/266 375/349 |

OTHER PUBLICATIONS

Ho et al., "Comparison of Various Periodograms for Sinusoid Detection and Frequency Estimation", Aug. 6, 2002, IEEE Transactions on Aerospace and Electronic Systems, vol. 35, pp. 945-952.*

(Continued)

*Primary Examiner* — David B. Lugo
(74) *Attorney, Agent, or Firm* — Knobbe, Martens, Olson & Bear, LLP

(57) ABSTRACT

A system and method for detection of complex sinusoidal signals. The method can include obtaining a set of complex-valued samples of one or more signals, in the presence of unknown noise, using a plurality of sensors. The presence of κ candidate complex sinusoids can be assumed. Then, κ candidate complex sinusoids in the set of complex-valued samples can be estimated. The method can include comparing a measurement of the energy of the κ estimated candidate complex sinusoids with a threshold value. Based on the comparison, a determination can be made whether to assume a different number of candidate complex sinusoids and repeat the estimation and the comparison steps, or to specify the estimated κ candidate complex sinusoids as detected complex sinusoids. The threshold value can be determined using a penalty value which reduces the probability of overestimating the number of complex sinusoids.

37 Claims, 21 Drawing Sheets

(51) Int. Cl.
  *H04B 7/10* (2017.01)
  *H04B 17/336* (2015.01)
  *H04L 27/34* (2006.01)
  *H04B 7/0413* (2017.01)
  *H04L 27/26* (2006.01)

(52) U.S. Cl.
  CPC .......... *H04B 17/336* (2015.01); *H04L 27/34* (2013.01); *H04L 27/2636* (2013.01); *H04L 27/2649* (2013.01)

(56) References Cited

OTHER PUBLICATIONS

Kwan et al., "Adaptive Detection and Enhancement of Multiple Sinusoids Using a Cascade IIR Filter", Jun. 7-9, 1988, IEEE International Symposium on Circuits and Systems, 2647-50.*
3GPP, "Spatial Channel Model for Multiple Input Multiple Output (MIMO) Simulations", 3GPP TR 25.996, Sep. 2012, pp. 2, http://www.3gpp.org/DynaReport/25996.htm.
Carobbi et al., "The Absolute Maximum of the Likelihood Function of the Rice Distribution: Existence and Uniqueness", IEEE Transactions on Instrumentation and Measurement, Apr. 2008, vol. 57, No. 4, pp. 682-689.
Dogandžić et al., "Estimating Jakes' Doppler Power Spectrum Parameters using the Whittle Approximation", IEEE Transactions on Signal Processing, Mar. 2005, vol. 53, No. 3, pp. 987-1005.
Durgin et al., "New Analytical Models and Probability Density Functions for Fading in Wireless Communications", IEEE Transactions on Communications, Jun. 2002, vol. 50, No. 6, pp. 1005-1015.
Herdin et al., "Correlation Matrix Distance, a Meaningful Measure for Evaluation of Non-Stationary MIMO Channels", IEEE 61st Vehicular Technology Conference, Jan. 2005, pp. 136-140.
Jachan et al., "Nonstationary Vector AR Modeling of Wireless Channels", IEEE 6th Workshop on Conference: Conference: Signal Processing Advances in Wireless Communications, Jun. 2005, pp. 648-652.
Jakes, William C., "Microwave Mobile Communications," Wiley-Interscience, IEEE, 1974, pp. 645. . [Uploaded in 4 parts].
Kwan et al., "Adaptive Detection and Enhancement of Multiple Sinusoids Using a Cascade IIR Filter", IEEE International Symposium on Circuits and Systems, Jun. 7-9, 1988, pp. 2647-2650.
Pätzold, Matthias, "Mobile Fading Channels," John Wiley & Sons, England, ISBN 0471495492, 2002, pp. 430.
Pedersen et al., "A Stochastic Multiple-Input-Multiple-Output Radio Channel Model for Evaluation of Space-Time Coding Algorithms", Vehicular Technology Conference Fall 2000. IEEE VTS Fall VTC2000, 52nd Vehicular Technology Conference, Sep. 24-28, 2000, vol. 2, pp. 893-897.
So et al., "Comparison of Various Periodograms for Sinusoid Detection and Frequency Estimation", IEEE Transactions on Aerospace and Electronic Systems, Dec. 15, 1998, vol. 35, pp. 945-952.
Székely et al., "A New Test for Multivariate Normality" Journal of Multivariate Analysis, 2005, vol. 93, No. 1, pp. 58-80.
Talebi et al. "Correlation-Based Multipath Modeling of Indoor Wideband Space-Polarization MIMO Channels in Presence of Specular Reflections", IEEE Transactions on Wireless Communication, 2015, pp. 1-24.
Talebi et al. "Reference No. 15: Channel Sounding and Parameter Estimation for a Wideband Correlation-Based MIMO Model", IEEE Transactions on Wireless Communications, Feb. 2015, pp. 25-34.
Tepedelenlioğlu et al., "The Ricean K Factor: Estimation and Performance Analysis", IEEE Transactions ON Wireless Communications, Jul. 2003, vol. 2, No. 4, pp. 799-810.
Yu et al., "Modeling of Wideband MIMO Radio Channels Based on NLOS Indoor Measurements," IEEE Transactions on Vehicular Technology, May 2004, vol. 53, No. 3, pp. 655-665.
Yu et al., "Models for MIMO Propagation Channels, A Review", in Wiley Journal on Wireless Communications and Mobile Computing Special Issue on Adaptive Antennas and MIMO Systems, Jul. 8, 2002, vol. 2, No. 7, pp. 653-666.

* cited by examiner

METHOD AND APPARATUS FOR SINUSOID DETECTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Patent Application 62/132,162, filed Mar. 12, 2015, and entitled "Method and Apparatus for Sinusoid Detection," and to U.S. Provisional Patent Application 62/307,998, filed Mar. 14, 2016, and entitled "Method and Apparatus for Sinusoid Detection," the entire contents of each of which are hereby incorporated by reference herein.

STATEMENT REGARDING FEDERALLY SPONSORED R&D

This invention was made with government support under contract N00014-11-1-0607 awarded by the U.S. Office of Naval Research. The government has certain rights in the invention.

BACKGROUND

Field

This disclosure relates to the field of sinusoid detection.

Description of the Related Art

The detection of sinusoidal signal components is a problem of great importance in signal and image processing. Oftentimes, the sinusoidal components that are present in a signal are disguised by noise, making it difficult to detect them. There is thus a need for improved techniques for detecting sinusoidal signal components in signals corrupted by noise.

SUMMARY

In some embodiments, A method for detection of complex sinusoidal signal components comprises: obtaining a set of complex-valued samples of one or more signals, in the presence of unknown noise, using a plurality of sensors; assuming the presence of κ candidate complex sinusoidal signal components in the set of complex-valued samples; estimating κ candidate complex sinusoidal signal components in the set of complex-valued samples; comparing a measurement of the energy of the κ estimated candidate complex sinusoidal signal components with a threshold value; and based on the comparison, determining whether to assume a different number of candidate complex sinusoidal signal components and repeat the estimation and the comparison steps, or to specify the estimated κ candidate complex sinusoidal signal components as detected complex sinusoidal signal components, wherein the threshold value is determined using a penalty value which reduces the probability of overestimating the number of complex sinusoidal signal components in the set of complex-valued samples.

DETAILED DESCRIPTION

Figure 1:
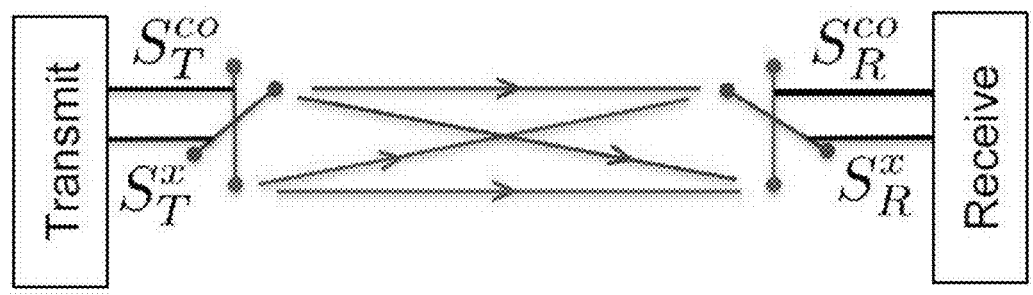
FIG. 1: Dual-Polarized MIMO System.

There is a need for a coupled channel modeling/measurement/characterization framework to facilitate the evaluation of different energy-efficient MIMO communications architectures and technologies. Disclosed herein are methods for modeling wideband multi-port channels; methods for estimating corresponding channel parameters based on channel sounding measurements; and methods for establishing the goodness of fit of these characterizations. The coupling between these capabilities provides a framework for realizing channel models representative of physical channels encountered in indoor and outdoor environments and that can be used in support of MIMO systems analysis.

Prior work in the wideband modeling area is predominantly associated with one of two modeling approaches. The first is known as the double directional model, where angle of arrival/departure information is used along with other parameters to characterize multipath clusters in the propagation channel. The second type falls under correlation-based modeling, which provides input-to-output characterizations without detailed modeling of the specific physical mechanisms responsible for the input-to-output responses. This disclosure relates generally to the latter category.

Within the set of correlation-based modeling approaches, some models consider the limited case in which the system operates in a non-specular environment, where such, characterizations typically involve computation of a complex channel correlation matrix assuming that all the channel impulse response components can be modeled by Gaussian random matrices. These approaches neglect specular reflection components that can exist in realistic propagation channels. This disclosure extends these models by integrating parameterizations of deterministic components into the model. Some embodiments of the augmented model incorporate a finite impulse response path delay representation for wideband channel realizations (with a deterministic component), and utilize statistical representations for each path. Some of the main model parameters describing each path in some embodiments of the model include power asymmetries among all pairs of array antennas, power ratios relating the power levels of Gaussian and deterministic components, Doppler spectra of the various delay paths, the carrier frequency and amplitude of the deterministic component(s), and correlation properties of the Gaussian component. The adoption of time-correlation models can be justified by showing that assumptions of Rician amplitude distributions in frequency sub-bands that are often assumed in literature can be misguided when independent deterministic components exist at different delays. A solution is to adopt a time-domain method where deterministic components are addressed on a path-by-path basis, as discussed herein. This disclosure also relates to characterization of channels with multiple specular components at any delay.

The parameters defining the above time correlation model can readily be implemented in a path-based channel emulation system. A logical question arises: Can channel sounding be used to estimate channel parameters associated with the model and that are programmed into the emulation system? If affirmative, this would lead to the conclusion that physical channels following the form of the channel model could also be measured by the sounding system and subsequently characterized (parameterized) using the modeling framework. A channel sounding system used to investigate this is described herein. The channel sounding system is based on an 80 MHz orthogonal frequency division multiplexing (OFDM) waveform using a test suite consisting of arbitrary waveform signal generators and coherent receiver chains (controlled with MATLAB) that enabled phase coherent signal generation and collection needed for the channel characterizations. The channel sounding system has been used to parameterize emulated channels based on the modeling framework. It has verified methods for estimating model parameters for each path with or without a deterministic signal, including sub-channel gains, correlations, Doppler spectra, and K factors. The efficacy of the technique is demonstrated using RF outputs from, a programmed channel emulator, where the estimated channel using the proposed analysis techniques is shown to be very closely matched to the programmed emulated channel. It has also been shown that the K-factor estimates derived from the maximum likelihood estimator can outperform two other well-known K-factor estimators described in literature.

A challenge that can be faced in measurement and parameter characterization involves the problem of identifying, estimating, and then, extracting multiple simultaneous deterministic components to facilitate more accurate estimation of the fluctuating statistical components. Techniques described herein enable sequential identification of the number of sinusoids followed at each stage by joint estimation of the multiple simultaneous deterministic components. This method has relevance to any application where it is advantageous to detect sinusoids.

The following disclosure includes several sections. Each section corresponds to a different article, all of which have been provided in the provisional patent applications to which this application claims priority. The appendixes and bibliographies referenced in each section can be found in the provisional applications. Each of the referenced documents is hereby incorporated by reference herein in its entirety. The numbering of sub-sections, equations, and tables begins anew in each section.

Section 1: Towards Efficient Spectrum Utilization with Polarization-Based Architectures I. Introduction Stewardship of the spectrum resource involves a balancing of wide-ranging influences, including technology, national security interests, federal regulation, standards bodies, economics, corporate interests and other factors, ideally for the common good. Technological advancements can provide a significant impact in this balance, because technology defines the possibilities of what may be achieved through a leveraging of the spectrum.

Over the past two decades, the spectrum has been increasingly viewed as an imminently scarce resource, with the anticipation of growing demands from military, commercial wireless and cellular users for applications and services involving higher and higher data rates and increased spatial reuse. Therefore considerable research and innovation have been advancing ways to utilize the spectrum, where different technologies are leading the charge towards more effective and widespread use of the spectrum. Examples include, but are not limited to, smart (cognitive) and programmable (software defined) radios, materials advances enabling low-power high-performance wideband multi-port devices, spectrum sharing, cellular topologies that are evolving towards small cells to improve spatial resuse, millimeter wave, WiFi and its ubiquity, heterogeneous networks, multiple-input multiple-output (MIMO) and other spectrally efficient techniques, and network and channel coding/decoding techniques that facilitate packet throughput.

As part of the MIMO "push", various physical layer constructs are being considered that enable radios to operate more effectively from link and network perspectives. Our research considers the utilization of polarization and space-polarization architectures to leverage both space and polarization channel correlations for system performance enhancement. We have considered these architectures for energy consumption minimization in packet erasure channels, for interference avoidance strategies at the transmitter that can facilitate full duplexing with wideband transmissions, and for interference suppression at the receiver to improve the interference tolerance of receivers. In this paper, we provide an overview of this research and summarize some of the key findings. We also describe experimental resources including a SP-MIMO communications testbed with channel emulation capability, SPMIMO transceivers, and two field research vehicles to support polarimetric research. Finally we discuss current research directions.

II. MIMO System Architectures

Figure 2:
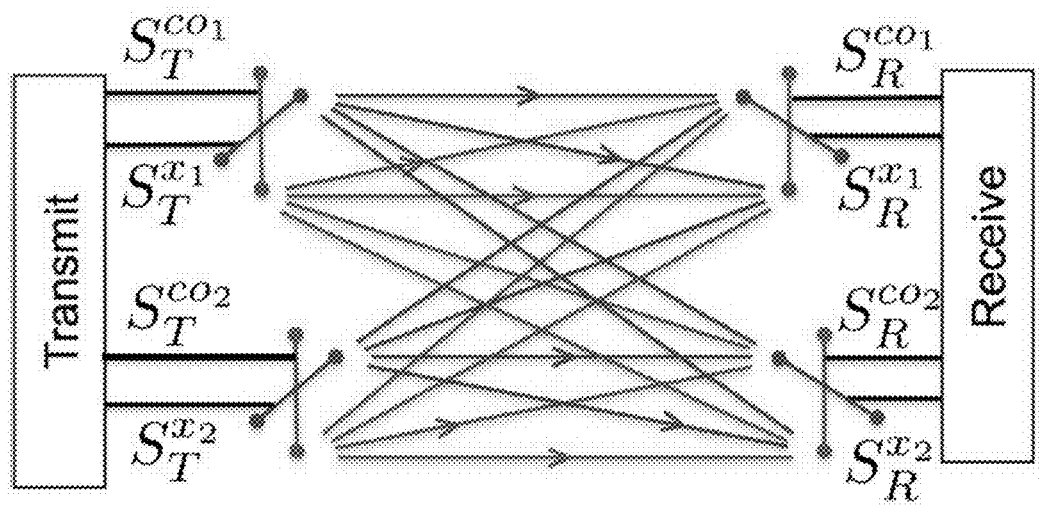
FIG. 2: Space-Polarized MIMO System.

The specific polarization-based MIMO architectures considered in our work includes dual-polarization MIMO (DP-MIMO) architectures and space-polarization MIMO (SP-MIMO) architectures. FIG. 1: Dual-Polarized MIMO System. As shown in FIG. 1, DP-MIMO architectures incorporate orthogonally-polarized elements that share a common phase center at each transceiver, leading to a 2×2 MIMO configuration. FIG. 2: Space-Polarized MIMO System. The DP-MIMO architecture can be expanded to incorporate additional space channels, for example to yield a 4×4 SP-MIMO system, as shown in FIG. 2. In this case there are 16 individual paths (and 256 correlations) that help to characterize the MIMO channel.

Polarization-based MIMO architectures offer certain advantages relative to more conventional co-polarized arrays. First, in space-constrained applications, one strategy for increasing system capacity, is to employ a dual-polarized antenna at each antenna location. Relative to conventional MIMO, this type of architecture can yield benefits from the additional degrees of freedom without substantially increasing the deployment footprint. Another important advantage is that the joint channel statistics of polarization-augmented systems are different than for conventional MIMO arrays, leading to a channel matrix exhibiting different statistical behavior. Hence, dual-polarized systems offer the possibility of improving performance where conventional MIMO might be highly disadvantaged simply because of channel statistics. That is why DP-MIMO architectures have especially been considered for space-constrained and line-of-sight (LOS) applications [1], [2], [3], [4]. One way to take advantage of polarization is through full-multiplexing schemes without channel state information at the transmitter (CSIT). In our research we quantified the relative achieved rate and energy efficiency of single-input-single-output (SISO), co-polarized MIMO (CP-MIMO), DP-MIMO, and SP-MIMO systems under the assumptions of full multiplexing without CSIT. As reported in a later section, polarization is seen to offer substantive gain in capacity and energy efficiency depending upon the channel behavior and the signal-to-noise ratio (SNR).

The performance of polarization-based MIMO architectures can be improved further through adaptive transmission techniques where channel state information is available to the transmitter. Past researchers have considered architectures that exploit CSIT for adaptive transmit polarization MIMO (APMIMO) schemes [5], [6], although these early systems had limited adaptive capability. They adjusted the relative power between transmitter polarization states to increase the overall system performance, but did not offer capability for arbitrary polarization control. In patent literature, forms of adaptive schemes have been considered by Hamalainen [7] and by Cyzs [8]. Hamalainen [7] considered a form a transmit diversity that potentially can employ cross-polarized arrays. Based on correlation measurements among the antenna outputs, a diversity mode is selected. Adaptive polarization transmission is selected only when the channels are highly correlated, corresponding to a flat-fading channel. In frequency selective channels, adaptive polarization modes would not be employed. Cyzs' patent deals with capacity enhancement using multiple antennas at the transmitter and the receiver by controlling antenna element spacings to orthogonalize the phases of the signals received at the receiver antennas. The approach is extended, to the use of antennas with orthogonal polarization, where the orthogonal polarizations are used strictly as separate sub-channels and are not leveraged to generate an arbitrary polarized signals.

Recently, more general AP-MIMO transmission, techniques with full-polarization control versus frequency have been considered for a 2×2 AP-MIMO system in the presence of channel impairments [9]. Here, "fully-adaptive" refers to the ability of the system to achieve arbitrary polarization (instead of merely being switched between a few states or adjusting only the relative powers between transmit modes), and where the polarization states are controlled as a function of frequency. For the specific case of orthogonal frequency-division multiplexing (OFDM) signaling, AP-MIMO transmissions were used to maximize the power transferred through the channel on a subcarrier-by-subcarrier basis. The approach is synonymous with those proposed for conventional MIMO systems with link channel knowledge [10], although in the case of dual-polarized architectures, polarization-frequency rather than space-frequency characterizations are applied. Results showed that AP-MIMO systems offer superior performance over conventional SISO for several different adaptive polarization transmission schemes [9]. These gains accrue due to the ability of adaptive polarization systems to exploit the polarimetric sensitivities of the propagation channel by controlling the transmit polarization based on CSIT.

Additional gains are possible by extending the AP-MIMO architecture to one that incorporates spatially-separated fully-adaptive dual-polarized antennas, yielding an adaptive space polarization MIMO (ASP-MIMO) architecture, where channel state information (CSI) is available at the transmitter. The CSI is used to optimize performance using eigenmode transmission with water-filling. In packet-based erasure channels, we have found that an optimal power setting can be used that yields a minimum in transmit energy consumption while achieving near-maximum achievable rates.

III. Channel Model

The development of a frequency-selective MIMO channel model to capture space and polarization behaviors is discussed in this section. The model is an adaptation of one indicated primarily for non-line-of-sight (NLOS) channels [11], [12], [13] that assumes an $MR_1$ MT correlation-based multipath wideband MIMO model with Np paths:

$$H(t,\tau) = \sum_{n=1}^{N_P} \sqrt{P_n}\, H_n(t)\delta(\tau - \tau_n) \quad (1)$$

where $P_n$ represents the average path power, $\tau_n$ represents the path delay, and $H_n(t) \in \mathbb{C}^{M_R \times M_T}$ represents the path gain matrix, which is usually modeled as a complex Gaussian random matrix process.

The work in [11] is apparently the first to promote such an approach, however, power-correlation values were used instead of complex correlations. Later, [12] considered the same model but with the additional assumption that path correlation matrices have a Kronecker-product structure with complex correlation values. These above references assumed independent path statistics, referred to as the uncorrelated assumption (US). Later, [13] removed the US assumption and developed a multipath correlation-based model where path gain matrices were modeled with arbitrary correlations.

We extended the model further by proposing a form that also incorporates multiple LoS and/or specular components [14]

$$H(t;\tau) = \sum_{n=1}^{N_P} \sqrt{P_n} \left( \sum_{z=1}^{\upsilon_n} \overline{H}_{n,z} e^{i\omega_{n,z}t} + \tilde{H}_n(t) \right) \delta(\tau - \tau_n), \quad (2)$$

where $\upsilon_n$ represent number of specular components in each path, $\overline{H}_{n,z}$ represents the fixed specular matrix at Doppler frequency $\omega_{n,z}$ for $1 \le z \le \upsilon_n$ associated with the n-th path. $\tilde{H}_n(t)$ represents a Gaussian random matrix process with a Doppler spectrum and spatial correlation matrix described further below. The paths in Eq. (2) can be decomposed into specular (non-fluctuating) $\overline{H}_n(t)$ and fluctuating $\tilde{H}_n(t)$ components as [14]:

$$H_n(t) = \sum_{z=1}^{\upsilon_n} \underbrace{\overline{H}_{n,z} e^{i\omega_{n,z}t}}_{\overline{H}_n(t), specular} + \underbrace{\tilde{H}_n(t)}_{fluctuating} \quad (3)$$

For the specular and fluctuating components of each path [14], we propose the following structure:

$$H_n(t) = \sum_{z=1}^{\upsilon_n} X_n \odot \tilde{K}_{n,z} \odot \underbrace{\Phi_{n,z} e^{i\omega_{n,z}t}}_{\overline{H}_{n,z}} + X_n \odot \tilde{K}_{n,0} \odot \underbrace{G_n(t)}_{\tilde{H}_n(t)} \quad (4)$$

where matrices $X_n$, which are used to represent power imbalances, are real and positive-valued and are normalized so that [14]

$$\|X_n\|_F^2 = M_R M_T. \quad (5)$$

The matrices $K_{n,z}$ divide the power on path n between the fluctuating component and the specular rays so that [14]

$$\sum_{z=1}^{\upsilon_n} \left([K_{n,z}]_{u,s}\right)^2 = 1, \, 1 \le u \le M_R, \, 1 \le s \le M_T. \quad (6)$$

The complex matrices $\Phi_{n,z}$ which have unit magnitude entries, represent the phases associated with the specular ray matrices $\overline{H}_{n,z}$.

To describe the random matrix process $G_n(t)$, we define [14]:

$$\text{vec}(G_n(t)) = g_n(t) \text{ for } n=1, \ldots, N_P. \quad (7)$$

where $$g_n(t) = C_n^{1/2} w_n(t). \quad (8)$$

and where over the time indices $t=1, \ldots, N_s$, $W_n = [w_n(1), \ldots, w_n(N_s)]$ is distributed as $CN(1, I_M \otimes J_{N_s \times N_s}(\omega_n^D))$ $$[J_{N_s \times N_s}(\omega_n^D)]_{p,q} = J_0(\omega_n^D |p-q|), 1 \le p,q \le N_S. \quad (9)$$

This definition corresponds to the assumption of the Jakes' U-shape Doppler spectrum [15]. Note that Cn represents the spatial correlation matrix for each path where for the sake of simplicity we assume that the paths are independent (US assumption).

Based on this model, the polarimetric decomposition for each path is represented by [14]:

$$H_n(t) = \begin{bmatrix} H_{vv,n}(t) & H_{vh,n}(t) \\ H_{hv,n}(t) & H_{hh,n}(t) \end{bmatrix} \quad (10)$$

with $$X_n = \begin{bmatrix} X_{n,VV} & X_{n,VH} \\ X_{n,HV} & X_{n,HH} \end{bmatrix} \quad (11)$$

Further, the co-polarization power ratio (CPR) associated with this representation is defined as [14]:

$$CPR_n = 10 \log_{10} \frac{\|X_{n,VV}\|_F^2}{\|X_{n,HH}\|_F^2}, \quad (12)$$

and the cross-polarization discrimination (XPD) associated with the V and H transmit polarizations are defined as [14]:

$$XPD_{V,n} = 10 \log_{10} \frac{\|X_{n,VV}\|_F^2}{\|X_{n,HV}\|_F^2} \quad (13)$$

$$XPD_{H,n} = 10 \log_{10} \frac{\|X_{n,HH}\|_F^2}{\|X_{n,VH}\|_F^2}. \quad (14)$$

IV. Channel Sounding

Figure 3:
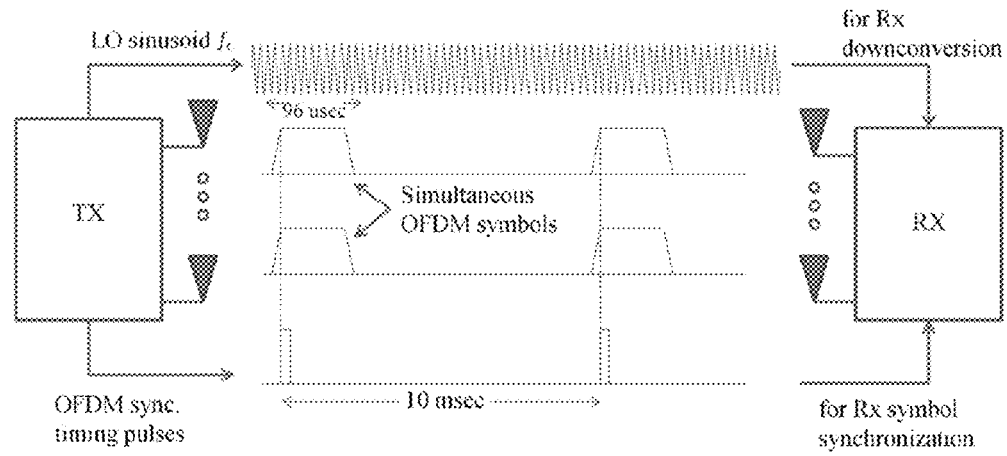
FIG. 3: Simultaneous multi-tone MIMO-OFDM channel sounding scheme.

Channel sounding for the proposed wideband multipath model is described in this section. We employ a MIMOOFDM scheme where distinct sets of subcarriers are allocated to different transmitter antennas so that all pairs of input-output frequency responses can be measured simultaneously. This approach is depicted in FIG. 3. FIG. 3: Simultaneous multi-tone MIMO-OFDM channel sounding scheme [16].

To achieve RF phase coherency between collected snapshots, the local oscillator used at the transmitter is also delivered to the receiver. Additionally, phase shifters are employed at the transmitter to compensate for fixed phase offsets between, the outputs of the different transmit antennas.

Figure 4:
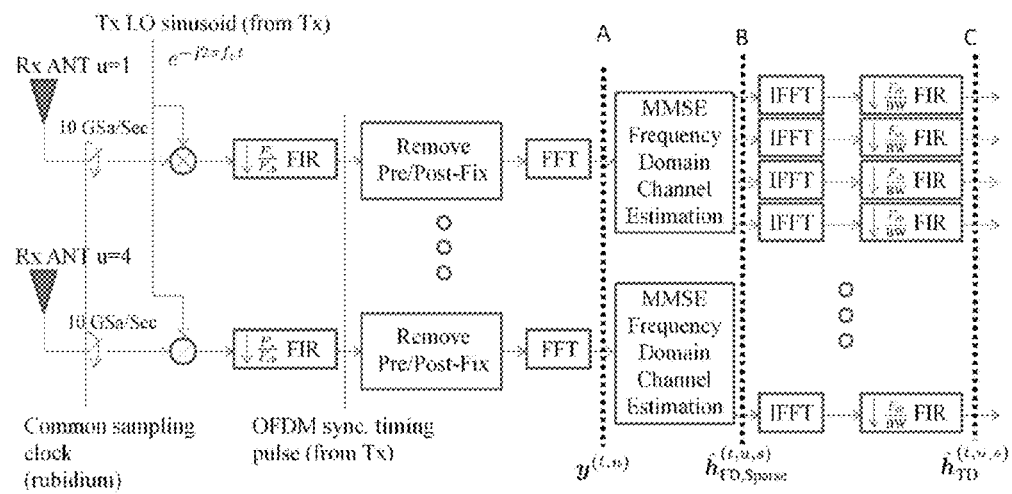
FIG. 4: Coherent simultaneous channel sounder receiver.

FIG. 4: Coherent simultaneous channel sounder receiver [16]. FIG. 4 shows the receiver signal processing unit. In order to avoid unwanted non-linear phase effect in the down-conversion process, digital RF sampling at $F_s=10$ GSa/sec is employed along with digital FIR down-conversion. To achieve coherency between the receive channels, all the samplers are clocked, with a common sampling clock. The signal processing units shown in FIG. 4 are necessary to maintain the coherency between all entries of the measured matrix although they are measured at different frequencies. The phase coherency that is achieved through the above methods limits the incidence of phase rotation errors that would otherwise be introduced in the measured correlation matrices. The receiver then transforms the wideband channel frequency response measurements $h_{FD,sparse}^{(t,u,s)}(\omega)$ to the delay domain $h_{TD}^{(t,u,s)}(\tau)$. The resulting outputs define the paths in the delay domain that are used in the parameter estimation algorithms to detect and estimate channel model parameters.

V. Parameter Estimation and Model Validation

Model parameter estimation algorithms described in [14] (Section 2) are applied to each detected path. For each of these paths, joint maximum likelihood (ML) estimation is applied to find the specular component matrix and the Doppler frequency associated with each specular ray, together with the complex correlation matrix of the fluctuating component. A major challenge is that the number of specular rays for the n-th path $v_n$ is unknown. We have derived a model selection algorithm [17], [18] (Sections 3 and 4) that postulates the number of specular rays and checks whether or not the postulated rays possess significant energy for that path. The proportion of the specular energy to the path energy which is assumed to be significant is approximately $$\frac{\ln N_S}{N_s}$$

for $N_s$ observations. Based on this threshold the algorithm first assumes that there is a specular ray in the path, then estimates it, and then compares its energy to the total energy. If the algorithm successfully finds a specular ray, then the number of postulated rays is incremented by one, and joint estimation is reapplied. The algorithm will iterate until the final set of postulated specular rays contains a specular ray with energy below the threshold, and the algorithm stops. As an example, measurements conducted in a large indoor lab yielded up to 4 specular rays for some of the detected paths.

We have shown performance similarities between the estimated models and the measured channels in terms of instantaneous capacity distribution, average and outage capacity, Doppler power spectrum, path power imbalances, K-matrices, frequency correlation function, and singular value distributions. We have also shown that for the measured channel, the same encoded QPSK 4×4 scheme utilizing linear MMSE filters yields a BER performance on the modeled channel that is only 0.7 dB difference from its performance on the real-world channel at BER=$10^{-3}$.

Section 2: Correlation-Based Multipath Modeling of Indoor Wideband Space-Polarization MIMO Channels in Presence of Specular Reflections Deployment of small cells results in an increased chance of the existence of line of sight (LoS) or strong specular reflections in short distance wireless MIMO channels. The existence of non-fluctuating (non-fading) specular components results in the appearance of sinusoidal components in, the time-varying channel impulse response that limit the use of correlation-based wideband MIMO models. In this paper we introduce a detection-estimation technique which can detect and enumerate specular rays and LoS components in the channel impulse response of a wideband MIMO channel. After detection, estimation and extraction of specular components, the remaining channel impulse response can be modeled using Gaussian random matrices. In this paper, we apply the proposed detection-estimation technique for the specular rays from measurements in an indoor environment. Based on the results of the proposed detection-estimation technique, we compare the instantaneous distribution of the subcarrier capacity as well as several other measures such as subcarrier singular-value distributions, frequency correlation function and outage and average capacities between the measured data and the stochastic model to show that the developed wideband model can accurately represent a measured channel containing multiple specular components to the degree considered in our analysis.

I. Introduction

MIMO and small cells are two key technologies in advanced wireless communication networks. With the shrinkage in cell radius and the introduction of small cells with radii well below 300 meters, the chance of observing LoS or specular reflections in the environment is expected to be larger as the distance d between the transmitter and the receiver is reduced [1, section 5.5.3]:

$$Pr[LoS] = \begin{cases} \frac{300-d}{300} & d \leq 300 \\ 0 & d > 300 \end{cases} \quad (1)$$

Previously, correlation-based multipath models have been employed for non line of sight indoor wideband MIMO channel and shown to have capability to accurately represent propagation effects [2], [3], [4] such as the average capacity and the frequency correlation function.

Given the anticipated densification of wireless networks, a natural question arises can correlation-based multipath models be adopted for the case of channels with line of sight or specular reflections? In the presence of such specular components, relatively strong sinusoidal components will exist at certain delay bins in the time-varying channel impulse responses that will prevent effective use of direct antenna correlation measurement of the type considered in the aforementioned references. However, in certain scenarios where the amplitude of these sinusoidal components are not themselves varying significantly we can show that by detection, estimation and extraction of those sinusoidal components the remainder of the channel impulse response can still be modeled with Gaussian random matrices that are represented with correlations. The fact that we can extract the nearly constant-amplitude sinusoidal components facilitates the use of tests for normality and stationarity of the remainder of the time-varying path gain matrices. Here, "path" refers to the MIMO channel impulse response associated with a resolvable delay bin within the delay-domain. These path gains are distinct from subcarrier gains typically associated with frequency-domain representations, such as used in [5], [6].

A trend in the modeling of wideband MIMO channels is the use of different modeling strategies to represent various forms of non-stationarity. Stationary multipath models are commonly represented by path correlation matrices, which can have different forms (e.g. Kronecker-product [2], [3] or full correlation descriptions [4]). On the other hand, non-stationary models can be zero-mean covariance non-stationary (e.g. time-varying autoregressive model [7]), or non-zero mean non-stationary (which is the class that our model lies in) or a combination of two (not yet proposed). The model that is presented and studied in this paper is a special case of non-zero mean non-stationary models. Within this class of non-stationary channels we consider the case that the mean value has a fixed amplitude and a phase that is progressive in time.

Figure 5:
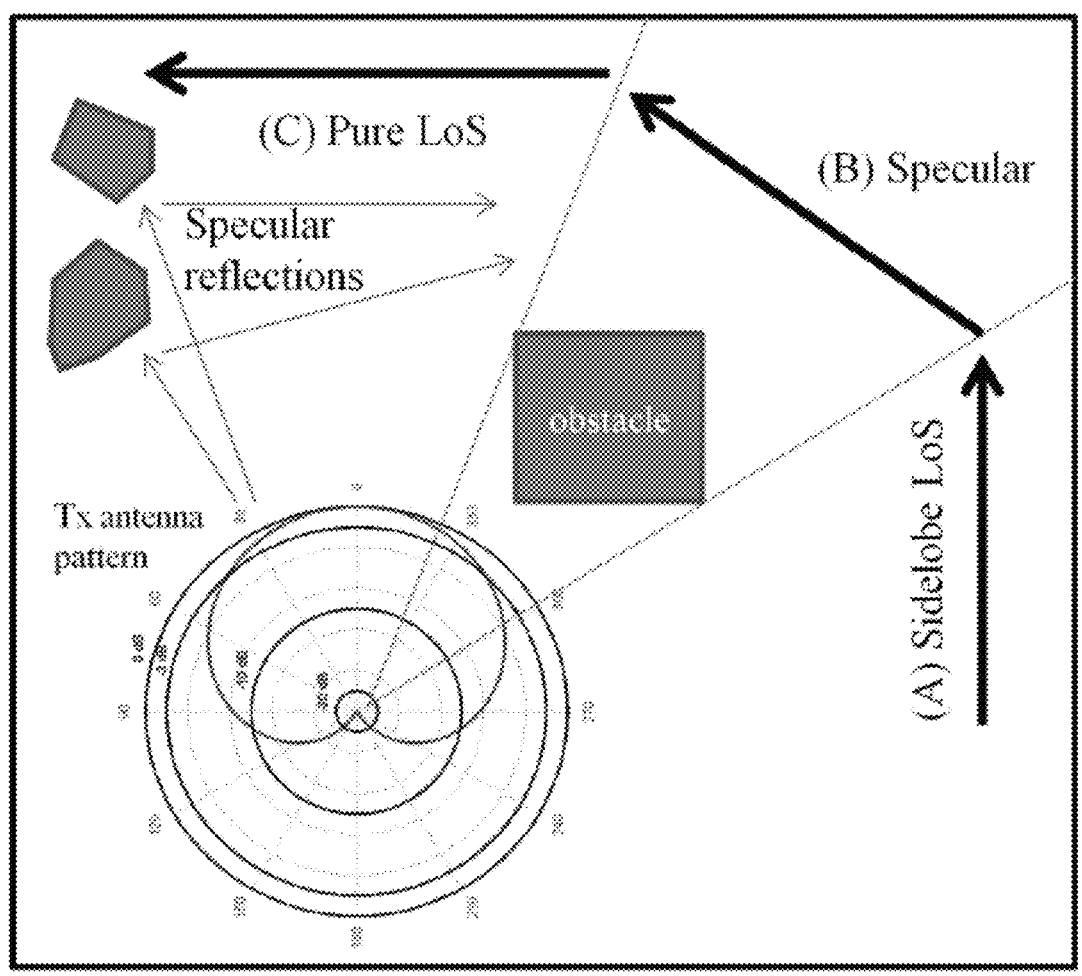
FIG. 5: Three indoor specular scenarios: (A) sidelobe LoS, (B) specular reflections, (C) pure LoS. Receiver antenna is assumed to have omni-directional pattern.
Figure 6:
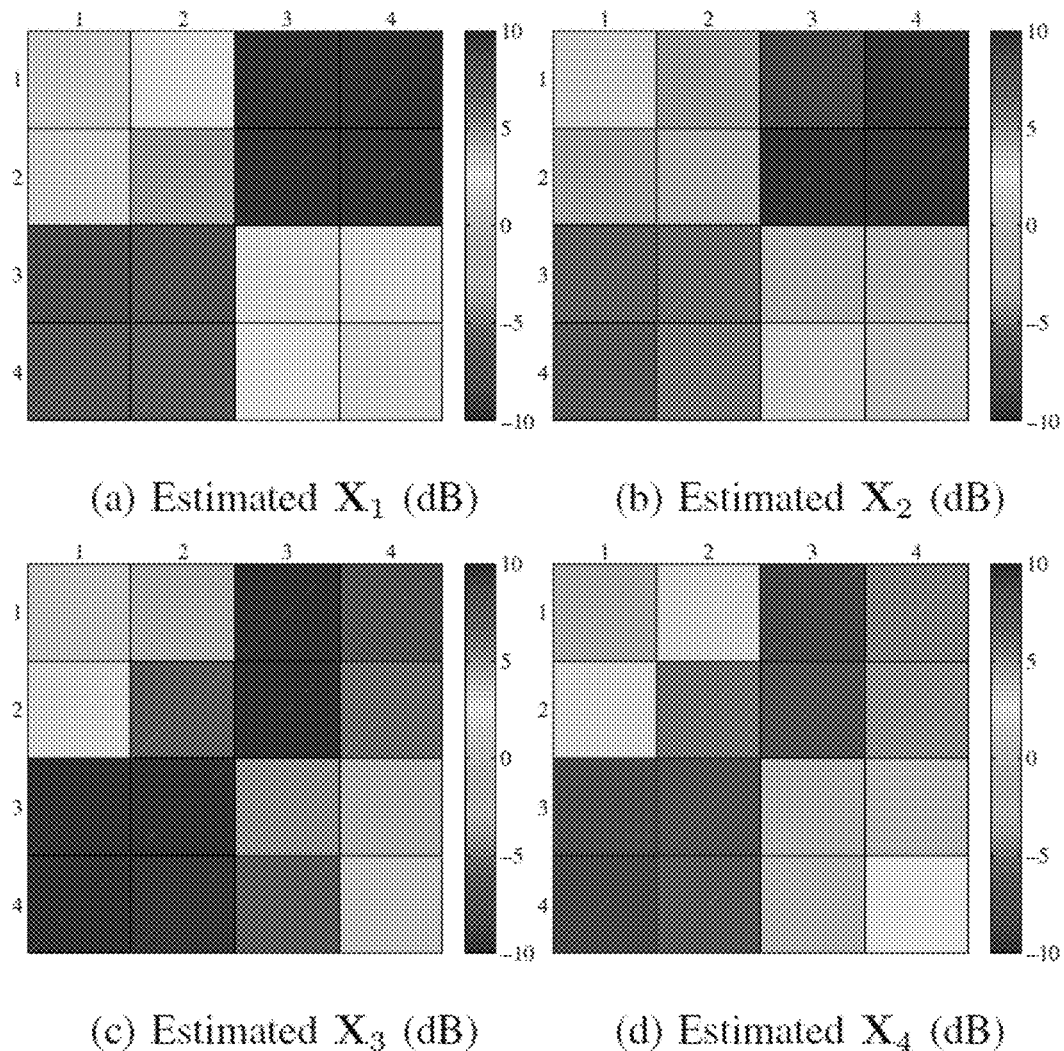
FIG. 6A-D show the estimated path power imbalance matrices for each path.

FIG. 5: Three indoor specular scenarios: (A) sidelobe LoS, (B) specular reflections, (C) pure LoS. Receiver antenna is assumed to have omni-directional pattern. To compare and contrast different types of non-zero mean non-stationary channels, FIG. 5 indicates three scenarios associated with a LoS or specular indoor channel assuming a directional transmitter antenna and an omni-directional receive antenna. In scenario (A) the receiver experiences a LoS component in the sidelobes, which exhibit variable amplitude as the receiver antenna moves in the shown direction. This behavior violates the assumptions of this paper and lies in the more general class of non-zero mean, non-stationary channels. In scenario (B) the LoS is blocked by an obstacle (a column in the real room), however, specular reflections from dominant scatterers in the room are manifest in the channel impulse response at certain delay bins as nearly constant-amplitude sinusoids. This type of channel cannot be effectively modeled with exiting correlation-based wideband models and is the subject of this paper. Finally, scenario (C) exhibits a delay path with a LoS path that would exhibit a nearly constant amplitude, but also consists of delay paths with specular components that will change in amplitude due to the large change in, the aspect angle to the scattering source. A main issue in correlation-based channel modeling is that we are limited by the number of independent samples that can be captured over a distance before the channel significantly changes its correlation characteristics. The adopted technique has been shown to be powerful in the detection and extraction of specular-rays when applied to only a small number of snapshots (512 snapshots) over a few meters in an indoor environment. After detection, estimation and extraction of nearly constant-amplitude specular components, we perform multivariate normality tests and stationarity tests to ensure that the remaining fluctuations can be modeled using a stationary Gaussian random process. We also show that the existence of specular reflections in the measured channel impulse responses (i.e. without extraction of sinusoidal components) may lead to estimates of path correlation matrices that result in lower estimates for subcarrier capacity. This has been an important limitation in the application of simplistic correlation-based channel models to represent channels with specular reflections or line of sight components (e.g. methods such as [8]).

As a final note, we emphasize that the presented model is capable of representing channels derived using various antenna architectures, including multi-polarized non-identical antenna arrays at both sides. Since this model is observation-based, antennas' polarization and pattern will be "implicitly" represented in the channel parameters. The measurement results contained in the paper are derived from a space-polarization MIMO configuration with two dual polarized antenna pairs (four antennas) spatially separated at both the transmitter and the receiver.

Throughout the paper † represents conjugate transpose, $i=\sqrt{-1}$, $\delta(\bullet)$ represents the Kronecker delta function, $\text{vec}(\bullet)$ represents a vector operator that stacks columns of a matrix into a vector, $\odot$ represents Hadamard or element-wise product, $\otimes$ represents the Kronecker product, $\|\bullet\|_F$ represents the Frobenius norm, $C^{M \times N}$ represents the space of M×N complex matrices, $A_t[\bullet]$ represents time-average, $I_D$ represents D×D identity matrix, $\text{Arg}[\bullet]$ represents angle of a complex value, $E[\bullet]$ represents expectation, $CN(\mu, R)$ represents the multivariate complex normal distribution with mean vector $\mu$ and covariance matrix R. The operator $\text{BlockDiag}(M_1, \ldots, M_N)$ generates a matrix with square matrices $M_1 \ldots, M_N$ on its diagonal. Also, capital letters with a capital subscript (such as $N_S$) denote a constant, while capital letters with small-case subscript index represent numbers which depend on the subscript index (such as $P_n$ which depends on n). Furthermore, if A is a stationary stochastic process and D is a deterministic matrix, then we define:

$$\mathcal{R}_{\{A\}} = \mathbb{E}[\text{vec}(A)^\dagger \text{vec}(A)] \tag{2}$$

and $$\mathcal{R}_{\{D\}} = \text{vec}(D)^\dagger \text{vec}(D). \tag{3}$$

Furthermore, the operator $\mathcal{R}_{\{\bullet\}}$ has the following properties:

$$\mathcal{R}_{\{D \odot A\}} = \mathcal{R}_{\{D\}} \odot \mathcal{R}_{\{A\}}. \tag{4}$$

II. Channel Model

A $M_R \times M_T$ multipath wireless MIMO channel may be represented in the time-delay domain as:

$$H(t; \tau) = \sum_{n=1}^{N_P} \sqrt{P_n} \, H_n(t) \delta(\tau - \tau_n) \tag{5}$$

where H (t,τ) represents the time-varying baseband impulse response of the channel. There are $N_P$ paths at fixed delays $\tau_n$ for n=1, . . . , $N_P$ with normalized path gain matrices $H_n(t) \in C^{M_R \times M_T}$ and path power $P_n$ such that:

$$\sum_{n=1}^{N_P} P_n = 1. \tag{6}$$

Path gain matrices are normalized such that their average over time is given by:

$$\mathbb{A}_t[\|H_n(t)\|_F^2] = M = M_R M_T. \tag{7}$$

Paths can be decomposed into specular (non-fluctuating) $\overline{H}_n(t)$ and fluctuating $\tilde{H}_n(t)$ components as $$H_n(t) = \underbrace{\sum_{z=1}^{v_n} \overline{H}_{n,z} e^{i\omega_{n,z}t}}_{\overline{H}_n(t), \text{specular}} + \underbrace{\tilde{H}_n(t)}_{\text{fluctuating}} \tag{8}$$

where $\overline{H}_{n,z}$ are constant complex-valued matrices, and $\tilde{H}_n(t)$ are zero-mean stationary Gaussian random processes. Also, $v_n$ represents the number of specular rays in nth path where these specular rays are distinguished by their constant and distinct Doppler frequencies $\omega_{n,z}$. In a more detailed and equivalent representation (see appendix A) we have:

$$H_n(t) = \sum_{z=1}^{v_n} \underbrace{X_n \odot \widetilde{K_{n,z}} \odot \Phi_{n,z} e^{i\omega_{n,z}t}}_{\overline{H}_{n,z}} + \underbrace{X_n \odot \widetilde{K_{n,0}} \odot G_n(t)}_{\tilde{H}_n(t)} \tag{9}$$

where the real and positive-valued matrices $X_n$ represent power imbalances between entries of the nth path channel matrix while keeping the total path power the same as the normalized average value, thus $$\|X_n\|_F^2 = M_R M_T. \tag{10}$$

Also, real and positive-valued matrices $K_{n,z}$ distribute the path power between the fluctuating component and specular rays in a way that guarantees the same path power normalization, i.e., $$\sum_{z=1}^{v_n} ([K_{n,z}]_{u,s})^2 = 1, \ 1 \le u \le M_R, 1 \le s \le M_T. \tag{11}$$

Furthermore, complex matrices $\Phi_{n,z}$ with unit magnitude entries represent the phases of specular ray matrices $\overline{H}_{n,z}$. Note that in general these specular rays can represent line of sight or any strong specular reflection at delay $\tau_n$, therefore we do not impose any assumption on the structure of the phase matrices.

Finally, the core of the fluctuating component is represented by the complex multivariate random processes $G_n(t)$. Dealing with these in the following vector form is more convenient, so consider:

$$\text{vec}(G_n(t)) = g_n(t) \text{ for } n=1, \ldots, N_p. \tag{12}$$

These vectors are correlated in time according to the Doppler power spectrum and across entries according to the path correlation matrix.

A. Uncorrelated Scattering (US) Model

Assuming uncorrelated scattering, the correlation of fluctuating components $g_n(t)$ across antennas can be represented based on correlation coefficient matrices $C_n$ and spatially-white and temporally-correlated random vectors $w_n(t)$:

$$g_n(t) = C_n^{1/2} w_n(t) \tag{13}$$

where at time indices $t=1, \ldots, N_s$ we have $W_n = [w_n(1), \ldots, w_n(N_s)]$ distributed as $CN(1, I_M \otimes J_{N_s \times N_s}(\omega_n^D))$ where $$[J_{N_s \times N_s}(\omega_n^D)]_{p,q} = J_0(\omega_n^D|p-q|), 1 \le p,q \le N_s. \tag{14}$$

This definition corresponds to the assumption of the Jakes' U-shape Doppler spectrum [9]. Note that (13) models time-domain characteristics of the fluctuating component of the channel, which is unlike previous correlation-based models [2], [3] that do not incorporate a time-dependent description. In collective form, all path correlation matrices can be included in a bigger matrix represented by $C_{US}$ and defined as:

$$C_{US} = \begin{bmatrix} C_1 & 0 & \cdots & 0 \\ 0 & C_2 & \cdots & 0 \\ \vdots & & \ddots & \\ 0 & \cdots & & C_{N_p} \end{bmatrix}. \tag{15}$$

This matrix is defined, to enable comparison of the US model and the full-correlation model which is described below.

B. Correlated Scattering or Full Correlation Model

If we do not assume that different paths provide uncorrelated scattering then the whole spatial correlation coefficient matrix between all paths $C_{Full}$ should be defined. This produces a model similar to [4], however, the following model also incorporates temporal variations. Set $$\begin{bmatrix} g_1(t) \\ \vdots \\ g_{N_p}(t) \end{bmatrix} = C_{Full}^{1/2} \begin{bmatrix} w_1(t) \\ \vdots \\ w_{N_p}(t) \end{bmatrix} \tag{16}$$

Where $W_n = [w_n(1), \ldots, w_n(N_s)]$ for $n=1, \ldots, N_P$ are distributed as $CN(1, I_M \otimes J_{N_s \times N_s}(\omega_n^D))$ for $J_{N_s \times N_s}$ matrices defined in (14).

C. Polarimetric Parameters

Although the model is not specific to polarization-based architectures, such architectures can readily be accommodated by the model. In our analysis, we assume the use of polarized arrays at both, sides of the communications link. We assume that there are $M_T/2$ dual-polarized antennas (with linear polarizations V and H) at the transmitter side and $M_R/2$ dual-polarized antennas at the receiver side. Since this model is observation-based, antenna characteristics are inherently embedded in the model parameters. The path gain matrix for the n-th path can be decomposed into four polarized sub-matrices:

$$H_n(t) = \begin{bmatrix} H_{vv,n}(t) & H_{vh,n}(t) \\ H_{hv,n}(t) & H_{hh,n}(t). \end{bmatrix} \tag{17}$$

Associated power imbalance matrices can also be decomposed into four $$\frac{M_R}{2} \times \frac{M_T}{2}$$

submatrices:

$$X_n = \begin{bmatrix} X_{n,VV} & X_{n,VH} \\ X_{n,HV} & X_{n,HH} \end{bmatrix} \tag{18}$$

which incorporate the following polarimetric power imbalance parameters; The Co-polar Power Ratio (CPR) which is defined as:

$$CPR_n = 10 \log_{10} \frac{\|X_{n,VV}\|_F^2}{\|X_{n,HH}\|_F^2}, \tag{19}$$

and, Cross-Polar Discrimination (XPD) for V and H polarizations defined as:

$$XPD_{V,n} = 10 \log_{10} \frac{\|X_{n,VV}\|_F^2}{\|X_{n,HV}\|_F^2} \tag{20}$$

$$XPD_{H,n} = 10 \log_{10} \frac{\|X_{n,HH}\|_F^2}{\|X_{n,VH}\|_F^2}. \tag{21}$$

D. Non-Stationarity

Note that the path model in (8) is not wide-sense stationary (WSS) since $\tau H$ nptq is a time-dependent mean value term. However, the stationary statistical models in (13) or (16) for the fluctuating channel component in conjunction with the time varying mean term for the fluctuating component provides a non-WSSUS model that is a trend-stationary, where the time-varying mean is the trend value of the process.

E. Frequency Domain Counterpart

The frequency domain counterpart of the model $$H(t;\tau) = \sum_{n=1}^{N_P} \sqrt{P_n}\left(\sum_{z=1}^{v_n} \overline{H}_{n,z} e^{i\omega_{n,z}t} + \tilde{H}_n(t)\right)\delta(\tau - \tau_n) \quad (22)$$

can be expressed as:

$$H(t;f) = \sum_{n=1}^{N_P} \sqrt{P_n}\left(\sum_{z=1}^{v_n} \overline{H}_{n,z} e^{i\omega_{n,z}t} + \tilde{H}_n(t)\right)e^{-i2\pi f\tau_n}. \quad (23)$$

The associated average power imbalance matrix in the frequency domain $X_F$ is given by:

$$X_F \odot X_F = \sum_{n=1}^{N_P} P_n X_n \odot X_n \quad (24)$$

and satisfies $$\|X_F\|_F^2 = M_R M_T. \quad (25)$$

F. Path Covariance Matrix for the Uncorrelated Scattering Model

In the US case, the path covariance matrix can be obtained from the correlation coefficient matrix $C_n$) using (2)-(4):

$$\mathcal{R}_{\{H_n\}} = \mathcal{R}_{\{X_n\}} \odot \mathcal{R}_{\{K_{n,0}\}} \odot C_n. \quad (26)$$

III. Specular Ray Enumeration and Path Estimation Algorithm

Let $N_S$ represent the number of time domain measurements associated with the n-th path in the delay domain. We intend to model the measured vector time-series $\text{vec}(H_n(t)) = h_n(t) \in \mathbb{C}^{M_R M_T \times 1}$ as a sum of a number of sinusoidal components and a Gaussian random part similar to model (8).

We introduce the following algorithm which allows for detection of significant sinusoids in the measured vector time-series $h_n(t)$:

1) Set $\kappa = 0$, $\alpha = 10^{-2}$ (an anticipated false alarm probability), and consider path gain snapshots $h_n(t)$ at times $t = 1, \ldots, N_S$.

2) Estimate $\kappa$ sinusoids in $h_n(t)$ and extract them to form the following time-varying vector:

$$x_{n,\kappa}(t) = \begin{cases} h_n(t) & \kappa = 0 \\ h_n(t) - \sum_{z=1}^{\kappa} \hat{h}_{n,z} e^{i\hat{\omega}_{n,z}t} & \kappa > 0 \end{cases} \quad (27)$$

where $\hat{h}_{n,z} = \text{vec}(\hat{H}_{n,z})$ represents the specular ray matrix associated with frequency $\hat{\omega}_{n,z}$. The estimation procedure can be found in appendix B.

3) Calculate $T_{n,\kappa}$ as follows:

$$T_{n,\kappa} = \arg\max_{\omega} \frac{\left|\frac{1}{N}\sum_{t=1}^{N} x_{n,\kappa}(t)e^{-i\omega t}\right|^2}{\frac{1}{N}\sum_{t=1}^{N}|x_{n,\kappa}(t)|^2 - \left|\frac{1}{N}\sum_{t=1}^{N} x_{n,\kappa}(t)e^{-i\omega t}\right|^2} \quad (28)$$

which is in fact a K-factor estimation [10] generalized to the MEMO case. If a sinusoid still remains in $x_{n,\kappa}(t)$ the value of $T_{n,\kappa}$ is similar to a SNR estimate of that sinusoid. Comparing this value with the minimum SNR values that can be detected will show us whether a significant sinusoid remains or if the value can be attributed to the finite-sample behavior of noise. The threshold computed in the next step provides an estimate of this minimum SNR level.

4) Estimate that maximum Doppler frequency associated with a given path and use this to calculate a threshold value $T_{TH,n,\kappa}$:

$$T_{TH,n,\kappa} = \frac{\log\frac{N_{n,\kappa}}{\alpha}}{N_{n,\kappa}} \quad (29)$$

where $$N_{n,\kappa} = \frac{\hat{\omega}_{n,\kappa}^D}{2\pi} N_s \quad (30)$$

and $$\hat{\omega}_{n,\kappa}^D = \sqrt{\frac{2\sum_{t=1}^{N-1}|x_{n,\kappa}(t) - x_{n,\kappa}(t+1)|^2}{\sum_{t=1}^{N-1}|x_{n,\kappa}(t)|^2}}. \quad (31)$$

This threshold value (29) results from several authors' studies of the problem of finite-sample detection of sinusoids in correlated noise [11], [12]. The threshold provides an estimate of the minimum detectable SNR for a sinusoid in noise. So, it can establish a lower limit for $T_{n,\kappa}$. The threshold depends on the number of independent samples available, $N_{n,\kappa}$, and is a function of maximum Doppler shift in each path. We have assumed Jakes' Doppler power spectrum, so the maximum Doppler frequency for each path $\hat{\omega}_{n,\kappa}^D$ can be estimated using (31) which is derived from a generalized sample-covariance based method [13, (10)] and is also used in [14]. It is known to be suitable for short data records which is the case in this paper.

TABLE I

| Antenna Specifications | | | | |
|---|---|---|---|---|
| | elevation (V/H) | azimuth (V/H) | gain (V/H) | port isolation |
| Tx[1] | 16°/16° | 90°/75° | 14/14 dBi | 28 dB |
| Rx[2] | 24°/30° | 360° (omni) | 6.5/5.5 dBi | 30 dB |

5) Compare $T_{n,\kappa}$ and $T_{TH,n,\kappa}$:

$$\begin{cases} \text{If } T_{n,\kappa} < T_{TH,n,\kappa} \text{ and go to Step 7.} \\ \text{If } T_{n,\kappa} \geq T_{TH,n,\kappa} \text{ go to Step 6.} \end{cases} \quad (32)$$

6) Set κ←κ+1 and go to Step 2.

7) Set $\hat{\upsilon}_n = \kappa$, $\hat{\omega}_n^D = \hat{\omega}_{n,\kappa}^D$. Finish. (Sections 3 and 4 provide additional information regarding some embodiments for detecting the value for $\hat{\upsilon}_n$.)

If the algorithm does not stop at a reasonable value for $\hat{\upsilon}_n$ (which, intuitively, is below approximately 10), then α should be decreased by one order of magnitude (i.e. picking a more conservative false alarm, probability) and the algorithm should be reapplied. Once the algorithm converges, values are obtained for $\upsilon_n$, $\omega_{n,z}$, matrices $\hat{H}_{n,z}$ and $\hat{C}_n$ from appendix B, which are enough to represent the models in (8) and (9). Results from the application of this algorithm and the obtained model parameters for a measured indoor channel are reported in the next section.

IV. Measurement Environment and Setup

The measurement environment is a large laboratory room (10 m by 15 m) with large metallic reflectors (e.g., tables and lab-benches) and a thick column in the center similar to the plan plotted in FIG. 5. We consider scenario (B) shown in FIG. 5. The transmitter employs two spatially-separated dual-polarized antennas with 90° azimuth beamwidth (four antenna ports) and the receiver employs two spatially-separated dual-polarized omni-directions antennas (four antenna ports) as described in table I. The antenna spacing at transmitter side is $d_{TX}=2\lambda$ and at the receiver side is $d_{RX}=2\lambda$ where the center frequency is 2442.5 MHz and an 80 MHz bandwidth is considered. Channel sounding of the 4×4 channel is performed at the mentioned center frequency and bandwidth to collect $N_S=512$ snapshots at a sounding rate of 100 Hz using a coherent simultaneous multitone channel sounder [15].

TABLE II

Path Parameters

| Path Index (n) | Delay $\tau_n$ (nsec) | PDP $P_n$ (dB) | $\hat{v}_n$ | $\hat{\omega}_n$ | CPR (dB) | XPD$_v$ (dB) | XPD$_h$ (dB) | $\hat{\omega}_n^\upsilon$ |
|---|---|---|---|---|---|---|---|---|
| 1 | 0 | −2.4 | 2 | [0.0614, 0.0380] | 0.89 | 10.3 | 19.4 | 0.0837 |
| 2 | 12.5 | −9.1 | 0 | | 4.1 | 9.7 | 11.0 | 0.1109 |
| 3 | 25 | −6.23 | 0 | | 6.8 | 16.1 | 5.9 | 0.1473 |
| 4 (=N$_p$) | 37.5 | −11.99 | 4 | [0.1055, 0.0859, 0.1190, 0.1301] | 4.1 | 11.4 | 5.7 | 0.1566 |

A. Estimation Results

Tables II and III provide the result of the specular ray enumeration and channel estimation algorithms applied to the indoor environment data described above. Besides the power delay profile, Table II shows the number of specular rays detected at each path $\hat{\upsilon}_n$ together with a vector containing their frequencies $\hat{\omega}_n$ as well as CPR, XPD$_v$, and XPD$_h$ values which are derived from the power imbalance matrix for each path $X_n$, and the estimated maximum Doppler shift $\hat{\omega}_n^D$. Table III provides detailed values of $T_{n,\kappa}$ and $T_{TH,n,\kappa}$ for different candidate numbers of specular rays κ. For each path, the value of κ that provides $T_{n,\kappa} < T_{TH,n,\kappa}$ is selected as $\hat{\upsilon}_n$. As can be seen, two specular grays are detected at the first path and four at the fourth path. We note that the presence of two or more sinusoids at a given path can deviate the frequency domain narrowband envelope distribution from Rayleigh distribution (which holds only for the fluctuating part) toward complicated distributions similar to two wave with diffuse power (TWDP) distributions introduced in [16]. The ability to represent channels with such complicated envelope distributions (also predicted in [17]) is enabled by adopting a time-domain modeling technique for wideband channels instead of utilizing frequency-domain (narrowband) modeling approaches.

FIGS. 6A-D shows the estimated path power imbalance matrices for each path, i.e. $10 \log_{10} [X_n]_{u,s}$ in dB scale for $1 \leq u, s \leq 4$. The colors are used to represent values between −10 and 10 in logarithmic (dB) scale. The x-axis and the y-axis indices represent transmitter and receiver antenna indexes respectively. We note that the CPR is the average ratio of elements in upper-left 2×2 block to elements in, the lower-right 2×2 block in these matrices. It is convenient to interpret the plots in the FIG. 6 as matrices defined in (18) and then considering CPR or XPD values defined by (19)-(20) as averaged ratios of the elements in four 2×2 blocks.

TABLE III

Specular Ray Enumeration Parameters $T_{n,\kappa}, T_{TH,n,\kappa}$ (dB)

| Path Index (n) | κ = 0 | κ = 1 | κ = 2 | κ = 3 | κ = 4 | $\hat{v}_n$ | α |
|---|---|---|---|---|---|---|---|
| 1 | 2.49, 0.65 | 4.90, 0.89 | −4.16, −0.19 | | | 2 | $10^{-2}$ |
| 2 | −9.14, −1.23 | | | | | 0 | $10^{-2}$ |
| 3 | −1.89, −2.72 | −1.65, −2.75 | −0.76, −2.80 | 0.17, −2.80 | −3.42, −2.29 | 4 | $10^{-2}$ |
| 4 | −6.94, −2.51 | | | | | 0 | $10^{-2}$ |

Figure 7:
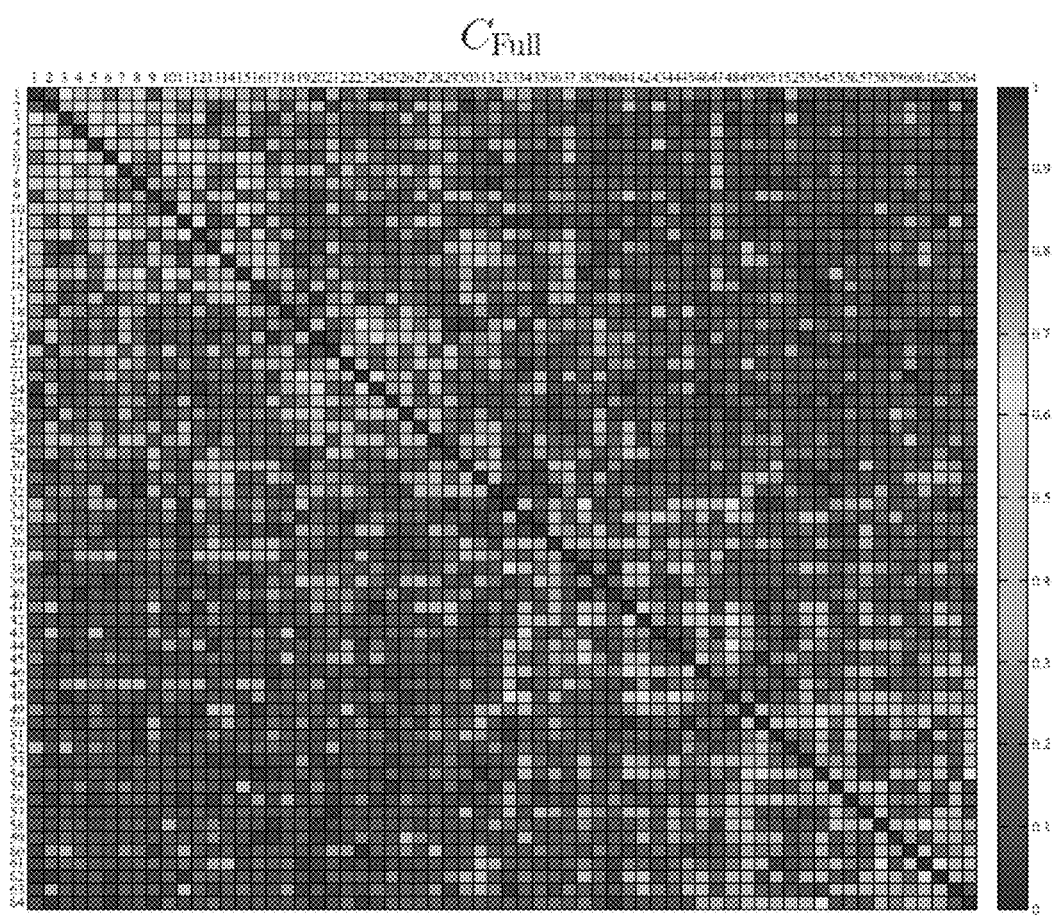
FIG. 7: Estimated full-correlation matrix between 16 entries of each path and between all 4 paths after extraction of specular rays.
Figure 8:
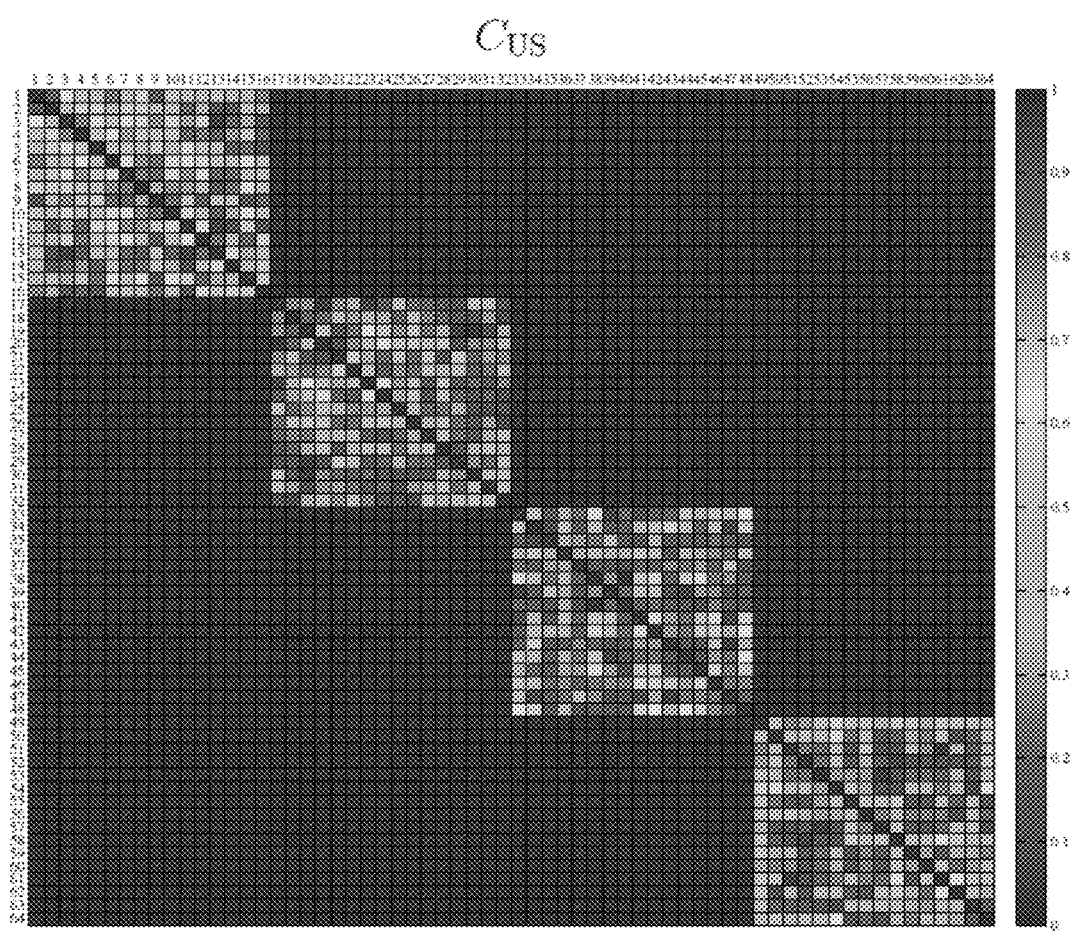
FIG. 8: Block-diagonalized correlation matrix for the US model after extraction of specular rays.
Figure 9:
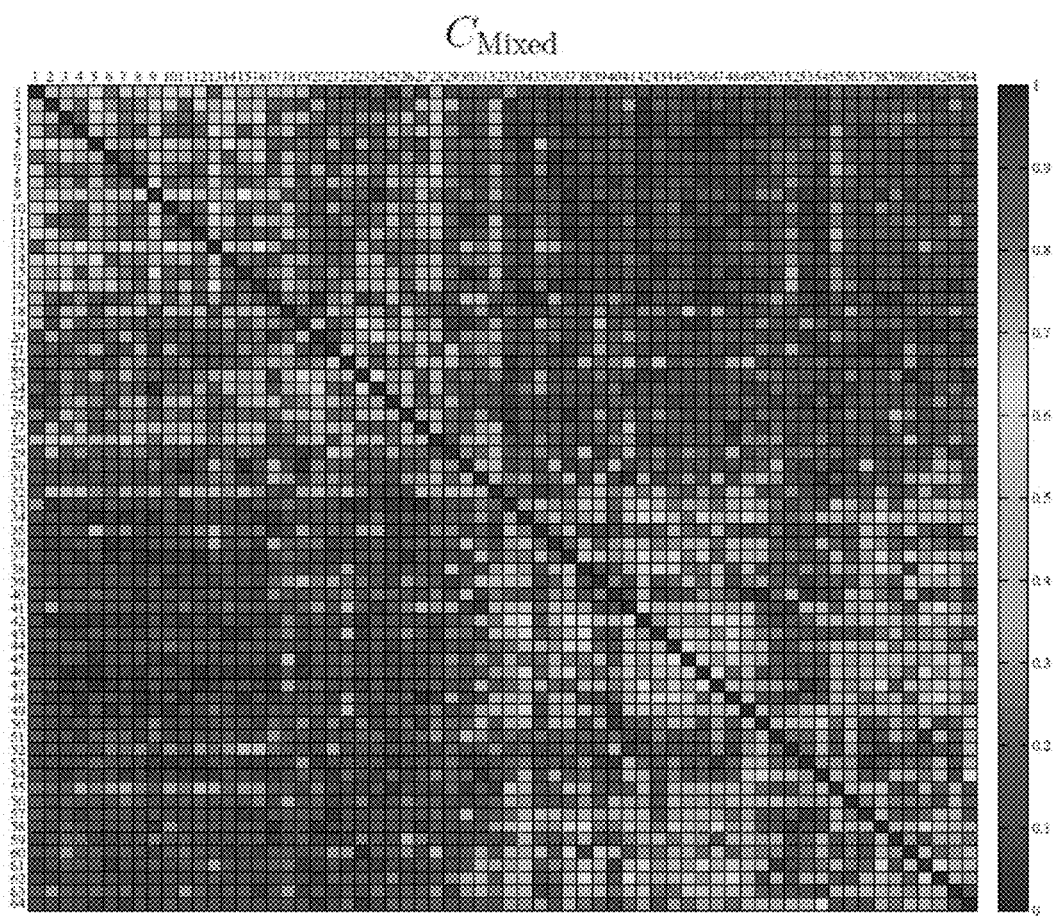
FIG. 9: Correlation matrix between 16 entries of each path and between all 4 paths without extraction of specular rays.

FIG. 7: Estimated full-correlation matrix between 16 entries of each path and between all 4 paths after extraction of specular rays. FIG. 8: Block-diagonalized correlation matrix for the US model after extraction of specular rays. FIG. 9: Correlation matrix between 16 entries of each path and between all 4 paths without extraction of specular rays. FIG. 7 shows the magnitude of the estimated correlation coefficients $C_{Full}$ for fluctuating components in all paths after the extraction of specular rays. In the case that a US model is assumed, this matrix can be tailored to become a block diagonal matrix as shown in FIG. 8. Note that we have only represented the magnitude of a complex matrix in these figures. FIG. 9 shows the correlation matrix that is obtained without the extraction of specular rays. This is what can be estimated using pure antenna-correlation approaches such as [2], [3], [4]. As can be seen, the upper-left 16×16 submatrix which is associated with path 1 is richer than what is shown for CFull because specular rays have not been extracted. If specular rays are not detected and extracted then richer inter-path correlation can also occur as can be seen in off-block-diagonal elements in FIG. 9. This might lead to the conclusion of correlated paths, although such a conclusion is drawn because of the existence of specular rays. Such biases in the correlations associated with the fluctuating components can be the result of a direct LoS or to the presence of specular reflections when simple antenna correlation calculations (without specular ray extraction) are employed.

V. Analysis of Measurement Data

In section III it is assumed that the measured data can be represented as a sum of sinusoids and Gaussian components. It is fitting, therefore, to verify such an assumption before reporting the results. This verification is often not performed in channel measurement literature and therefore might result in fitting Gaussian distributions on data that follows such distributions loosely. Here we investigate whether $x_{n,\kappa=\hat{v}_n}(t)$ satisfies multinormality and stationarity tests or not. Previously, references [5], [6], [18] have considered narrowband frequency domain channel responses as time series and analyzed them for normality and stationarity. In our case, we consider path gains for such an analysis, however, we use more advanced multinormality tests than the existing literature. For example, [5] uses Kolmogorov-Smirnov test for Gaussianity on each element of a measured vector time-series while we use a recent vector multinormality test that is applied to all entries at once. The details are provided in the discussion that follows.

TABLE IV

Multinormality test [19] p-value for stacked real and imaginary parts of fluctuating part of each path, 26 vectors of $M_R M_T = 16$ dimensions are used in the test for each part of each path.

| Path Index | p-value for real part | p-value for imaginary part |
|---|---|---|
| 1 | 0.3056 | 0.2624 |
| 2 | 0.6514 | 0.5849 |
| 3 | 0.8505 | 0.4381 |
| 4 | 0.0652 | 0.5114 |

1) Multinormality Test: After extraction of the sinusoids, a multi-normality test [19] has been conducted on the real and imaginary parts of $x_{n,\kappa=\hat{v}_n}(t)$ (for all values of n). Note that since normality tests depend on the number of samples and also assume independent samples, conducting such statistical tests on temporally correlated data can be misleading. Therefore we selected a sparse subset of snapshots (with a down-sampling ratio of 20, avoiding aliasing of the Doppler spectrum) so that samples are much less correlated in time. The sparse subset consists of 26 vectors with 16 dimensions and the p-values of the multinormality tests are reported in Table IV. It can be seen that all paths support the normality assumption to the extent that p-values of at least $5 \times 10^{-2}$ are observed.

2) Stationarity Test: In order to validate first moment stationarity of the vectors $x_{n,\kappa=\hat{v}_n}(t)$ we adopted the same MANOVA test as in [5, Sec. V-B]. We grouped 24 vectors used in the previous section in 3 groups each with 8 vectors to perform the mean stationarity test. The choice of the number of these groups is rather ad-hoc and affects the result a little. Using an F-distribution [5, Appendix] we calculated p-values for the hypothesis of mean stationarity of the real and imaginary parts of these 24 vectors for each path. Obtained values were between 0.142 and 0.602, affirming the mean-stationarity assumption since all p-values were above the 0.05 level. Note that this test is sensitive to oversampled snapshots and thus we performed the test on the sparse subset of snapshots.

In order to evaluate second moment stationarity, we used the correlation matrix distance (CMD) measure introduced in [20, (4)]. The CMD measure is a value between zero and one, where values closer to zero correspond to less change in the correlation matrix over time. The 512 snapshots available through $x_{n,\kappa=\hat{v}_n}(t)$ were combined into two groups of 256 vectors for each path, and the correlation matrix distance was measured. The obtained CMD values for four paths were 0.3213, 0.3355, 0.1239 and 0.2385. As can be interpreted from these values, the first and second paths show more non-stationarity (in terms of changing path correlation matrix), but are not high (say above 0.4) such that the stationarity assumption cannot be justified. In fact, this data motivates the consideration of more advanced models that can incorporate both specular rays and non-stationary correlation, a subject which lies in the scope of our future research.

VI. Evaluation of the Model

We now use the obtained model, which incorporates detection of specular rays, channel parameter estimation and multinormality and stationarity tests for the non-specular components, to investigate whether model parameters derived from measurements provides the same characteristics as the measured channel gains themselves. Previously, in wideband correlation-based MIMO modeling literature [2], [3], [4] the time-averaged subcarrier capacity, the sub-carrier capacity cumulative distribution function and the frequency correlation function (in [3]) have been used as, metrics to qualify the accuracy of the model. In this paper, in addition to these metrics we also compare outage capacity, singular value distributions, path Doppler power spectrum and average subcarrier power imbalance matrices. Outage capacity is considered because it provides a means to evaluate the accuracy of the predicted temporal capacity of the model, which is not easily accomplished using mean capacity or the capacity distribution function. Singular value distributions are considered to gauge the accuracy of the model when used in adaptive beamforming schemes. The path Doppler spectrum metric clarifies the extent to which the model produces time-domain correlation characteristics that are similar to the measured, channel. This has not been considered in previous correlation-based wideband model literature, however, it is important to correctly represent channel variations in time. Finally, the average subcarrier power imbalance matrix shows that the model produces power imbalances that are similar between entries with different polarizations.

A. Average Capacity and Subcarrier Capacity Cumulative Distribution Function

Figure 10:
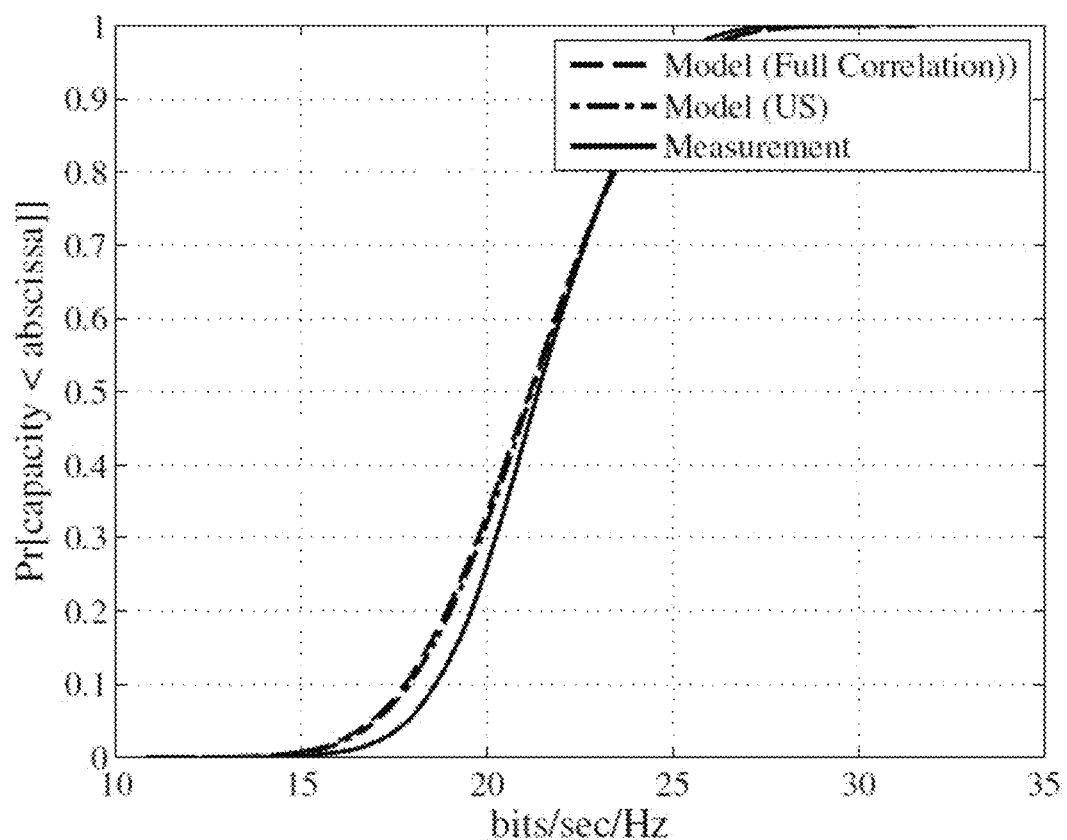
FIG. 10: Measured versus modeled subcarrier instantaneous capacity cumulative distribution function at 20 dB SNR, large room environment with blocked line-of-sight but with specular reflections.

For a given average signal to noise ratio (SNR), the instantaneous capacity of a subcarrier $f_k$ at time t is given by:

$$C(f_k; t) = \log_2 \det\left(I + \frac{SNR}{M_R M_T} H(t; f_k) H^\dagger(t; f_k)\right) \quad (33)$$

and therefore average capacity is given by:

$$C_{avg}(SNR) = \frac{1}{N_F N_S} \sum_{t=1}^{N_S} \sum_{k=1}^{N_F} C(f_k; t) \quad (34)$$

where $N_F = 1638$ represents the number of subcarriers in the 80 MHz bandwidth. For the measurements described in section IV, at 20 dB SNR we obtained 1% error in the average capacity for both US and full correlation models. FIG. 10 shows the cumulative distribution function for all values of $C(f_k; t)$ (all subcarriers in all snapshots) using the modeled and measured channels. Using the obtained distributions, the outage capacity was calculated for a 0.01 probability of outage. The US model and the full correlation model show −5% and −8% error respectively. FIG. 10: Measured versus modeled subcarrier instantaneous capacity cumulative distribution function at 20 dB SNR, large room environment with blocked line-of-sight but with specular reflections. From FIG. 10 it is seen that the models yield heavier lower tails in the capacity distribution and therefore a lower outage capacity.

B. Frequency Correlation Function

Figure 11:
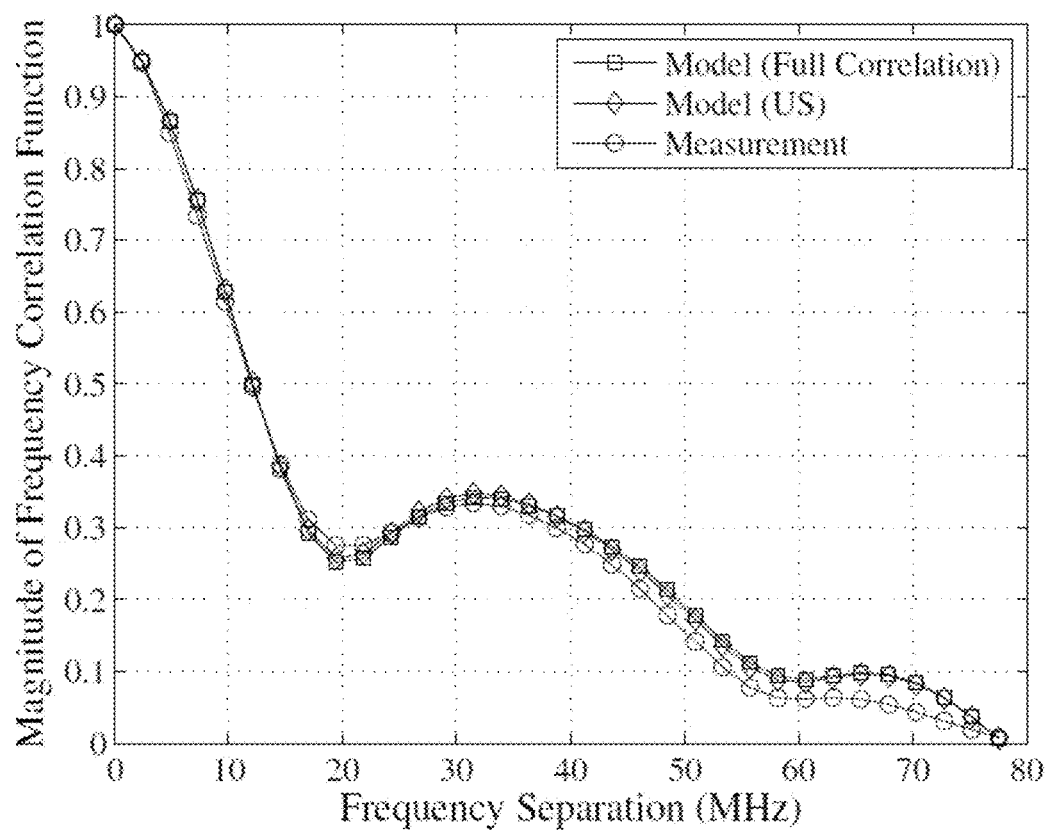
FIG. 11: Measured and modeled Frequency Correlation Function averaged over all pairs of subcarriers during the measurement time.

The frequency correlation function R(0,k) represents the correlation between two frequencies that are k subcarriers apart. Following [3], we define the correlation function as:

$$R(0, k) = \frac{\tilde{R}(0, k)}{\tilde{R}(0, 0)} \quad (35)$$

where $$\tilde{R}(0, k) = \sum_{t=1}^{N_S} \sum_{j=1}^{N_F-k} h^\dagger(t; f_j) h(t; f_{j+k}) \quad (36)$$

with h(t,$f_j$)=vec(H(t;$f_j$)). FIG. 11: Measured and modeled Frequency Correlation Function averaged over all pairs of subcarriers during the measurement time. FIG. 11 shows the frequency correlation function of the modeled and measured channels across the 80 MHz bandwidth. Frequency separation errors at correlation values of 0.9, 0.5 and 0.2 are about 0.25 MHz, 0.1 MHz and 2 MHz respectively.

C. Doppler Power Spectrum

Figure 12:
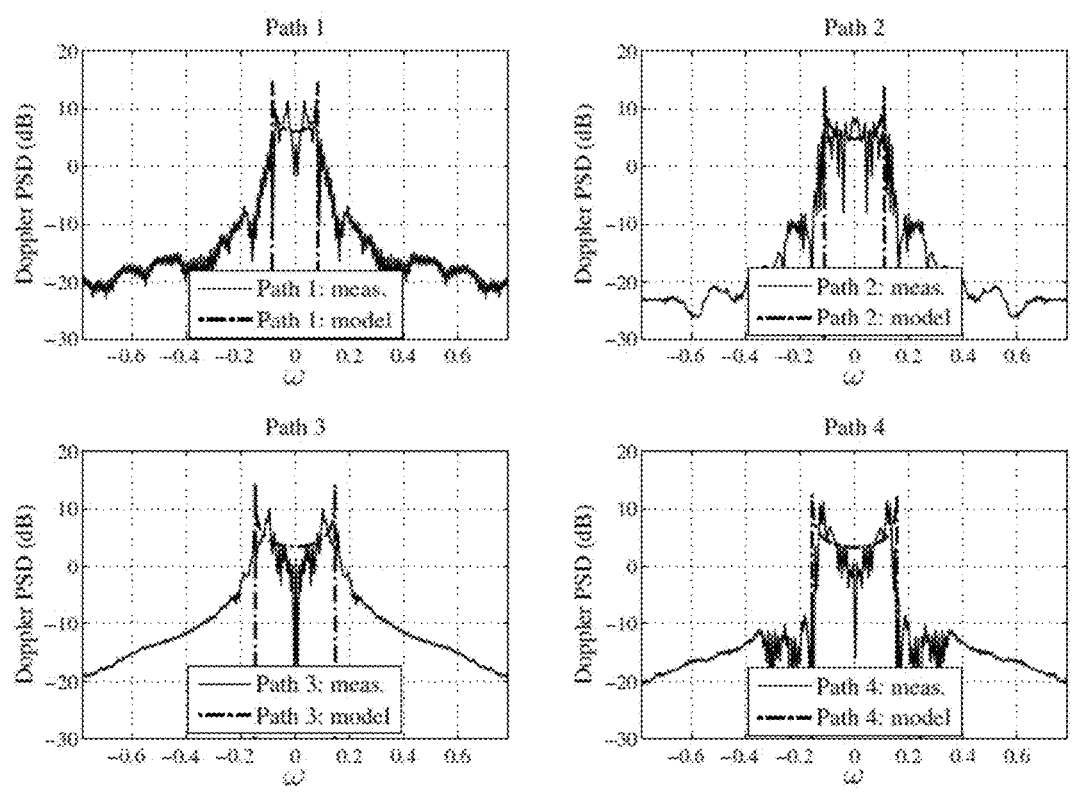
FIG. 12: Doppler power spectrum for non-specular part of each path.

Since a parametric (Jakes) Doppler power spectrum has been adopted for each path, the spectrum can be described by a parameter (or a set of parameters) obtained from the algorithm described in section III, i.e. $\hat{\omega}_{n,\hat{v}_n}^D$. Due to the adoption of this power spectrum form, a close fit to the measured non-parametric Doppler power spectrum is not guaranteed. The "closest" parametric model to the measured power spectrum will instead apply. FIG. 12: Doppler power spectrum for non-specular part of each path. FIG. 12 shows the measured nonparametric estimates of Doppler spectrum for the non-specular part of each path along with its parametric Jakes' estimate. The non-parametric estimates of Doppler spectrum of each path is derived based on Fourier transform of the time-domain correlation functions.

D. Average Subcarrier Power Imbalance Matrix

Figure 13:
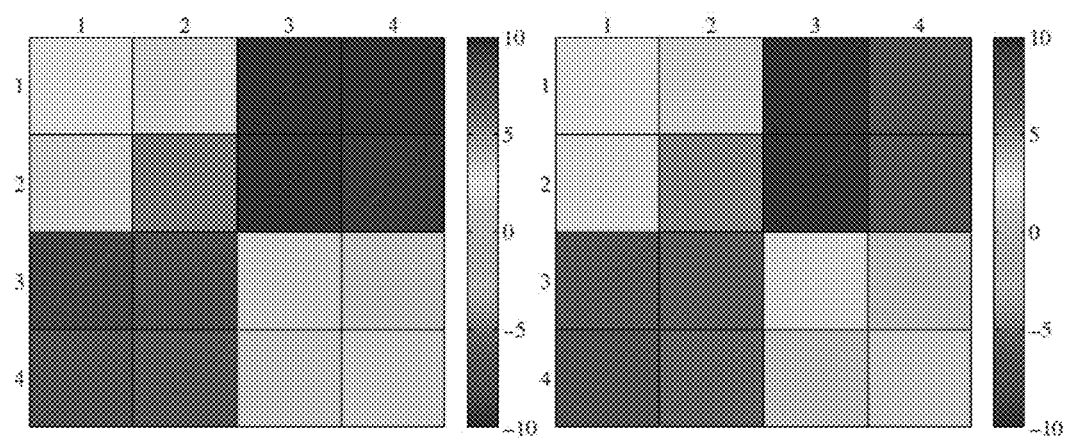
FIG. 13A-B: Modeled versus measured narrowband power imbalance matrix averaged over all subcarrier in the measurement time.

FIG. 13: Modeled versus measured narrowband power imbalance matrix averaged over all subcarrier, in the measurement time. FIG. 13 shows measured and modeled values of the average subcarrier power imbalance matrices XF defined in (24). Qualitatively, it can be seen that the model predicts the frequency domain power imbalance correctly. Note that both the US model and the full correlation model provide the same subcarrier power imbalance matrix.

E. Subcarrier Singular Value Distribution

Figure 14:
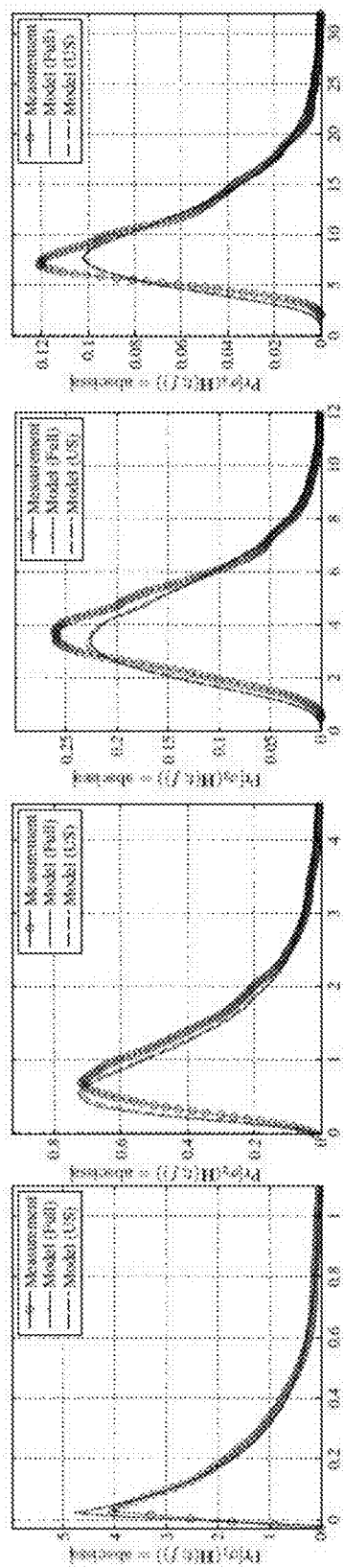
FIG. 14: Distribution of ordered singular values of all subcarrier channels in the measurement time, measurement vs. modeled.

FIG. 14: Distribution of ordered singular values of all subcarrier channels in the measurement time, measurement vs. modeled. As the final metric of comparison between modeled and measured channels, we plot the singular value distribution of all subcarrier channels at all snapshots in FIG. 14. The similarity in the shape and range of distributions suggests that the time-delay model of the channel impulse response applies in frequency-domain as well. We conclude that stochastic modeling of MIMO channel impulse responses provides a satisfying model even for narrowband applications in the presence of specular reflections.

VII. Conclusions

In this paper, we have proposed a method to extend the utility of correlation-based models to represent wideband MIMO channels with specular reflections and/or line-of-sight components. Detection-estimation algorithms were proposed and utilized to characterize measured indoor channels according to this framework. Arbitrary antenna architectures can be accommodated, and in this work we considered transmitter and receiver antenna arrays exhibiting diversities in space and polarization. The channel model considers estimation and removal of specular rays that may be represented as non-varying complex sinusoids in the channel impulse response as well as estimation of the correlation structure associated with the remaining fluctuating components in the multipath channel. The proposed approach is novel in stochastic modeling of wideband MIMO channels and extends the scope of correlation-based models to scenarios with line of sight channels or in channels where specular reflections exist. Two types of correlation structures were considered. First the full path correlation matrix which allows for arbitrary correlations among the paths, and second, the uncorrelated-scattering (block-diagonal) structure which models each path individually. We provided measurement results and several metrics to study the accuracy of the channel models. We obtained good matches between the measured and modeled channels in all the metrics and showed evidence that the proposed multipath correlation-based modeling approach can be used to represent channels even in the presence of specular reflections or line of sight components.

Section 3: Model Order Selection in Presence of Unknown Colored Noise

We consider the problem of detecting a number of complex sinusoids in unknown colored noise based on observations from an unstructured array. Based on extreme value theory, we first present a new model complexity penalty term for the log-likelihood function that outperforms both Minimum Description Length (MDL) and Akaike Information Criterion (AIC) in different array sizes. Second, we derive a new signal to noise ratio (SNR) threshold defining the breakdown point associated with the Maximum Likelihood (ML) estimator.

Model order selection, especially detecting the number sinusoids in noise, is of great importance in signal processing [1]. There are some fundamental solutions for such problems, including the Akaike Information Criteria (AIC) [2] and the Minimum Description Length (MDL) [3], [4]. Please refer to [5], [6] for a discussion on these criterion. In this paper, we focus on a new approach based on extreme value theory pioneered in [5], [6]. In particular, we consider a problem involving complex-valued vector observations and Gaussian noise with an arbitrary and unknown covariance matrix. To the best of our knowledge this problem has not been discussed elsewhere. We provide a model selection rule based on the uprising probability of one dimensional Chi-square random fields (from extreme value theory) and we compare its performance with the AIC and MDL criterions. Also, we derive a threshold SNR which predicts the SNR above which the model selection rules and therefore the ML estimation work well. This threshold SNR can also be interpreted as an ML breakdown threshold.

Throughout this paper, C represents the complex number space, Re{•} and Im{•} represent the real and imaginary parts, $(\cdot)^\dagger$ represents the conjugate-transpose, $(\cdot)^T$ represents the transpose, and i=$\sqrt{-1}$.

We define the partitioning operator Re Im{·} over matrix A as:

$$\text{ReIm}\{A\} = \begin{bmatrix} \text{Re}\{A\} & -\text{Im}\{A\} \\ \text{Im}\{A\} & \text{Re}\{A\} \end{bmatrix} \quad (1)$$

and the vector $a(\omega)$ as $[e^{-i1\omega}, \ldots e^{-in\omega}]^T$. Also, CN(m,R) represents the multivariate complex normal distribution with mean m and covariance matrix R.

II. Problem Formulation

Consider the following model for noisy observations x(t) of K complex sinusoid signals in an unstructured array of p sensors:

$$x(t) = \sum_{j=1}^{K} \mu_j e^{i\omega_j t} + \xi(t), \quad (2)$$
$$t = 1, \ldots, n$$

where t is discrete time, n is number of snapshots, K is number of complex sinusoids, $x, \mu_j, \xi \in \mathbb{C}^{p \times 1}$, the $\mu_j$ are unknown constant complex amplitude vectors, the $\omega_j$ are unknown frequencies and $\xi$ is temporally white and spatially colored complex normal noise with distribution CN (0,Q) where Q is its p×p complex covariance matrix which is not known. Without loss of generality we assume that $\mu_1^\dagger Q^{-1} \mu_1 \geq \ldots \geq \mu_K^\dagger Q^{-1} \mu_K$ where $snr_j = \mu_j^\dagger Q^{-1} \mu_j$ are called SNR. The joint signal and noise covariance estimation problem is to estimate the model order K which involves estimating of sinusoid frequencies $\omega_j$, the mean vectors and the noise covariance matrix Q.

A. Joint ML Estimation of Signals and Noise

We define the collective observation as $X=[x(1), \ldots, x(n)]$ and the parameter vector (assuming k signals exist) as:

$$\theta_{(k)}^T = \begin{cases} [\omega_{(k)}^T, \beta_{(k)}^T, \sigma^T(Q_k)] & \text{for } k > 0 \\ \sigma^T(Q_k) & \text{for } k = 0 \end{cases} \quad (3)$$

where $$\beta_{(k)}^T = [\text{Re}\{\mu_1^T\}, \text{Im}\{\mu_1^T\}, \ldots, \text{Re}\{\mu_k^T\}, \text{Im}\{\mu_k^T\}] \quad (4)$$

and $$\omega_{(k)}^T = [\hat{\omega}_1, \ldots, \hat{\omega}_k] \quad (5)$$

represent signal parameters and $\sigma(Q)$ is any full parameterization of a p×p complex covariance matrix which has $p^2$ free parameters.

Assuming a model order k maximized log-likelihood function can be derived as [7]:

$$\ln \mathcal{L}(\hat{\theta}_{(k)}; X) = -np \ln \pi - n \ln \det(\hat{Q}_k) - np. \quad (6)$$

Estimated covariance matrix is given by:

$$\hat{Q}_k = \frac{1}{n} \sum_{t=1}^{n} \left( x(t) - \sum_{j=1}^{k} \hat{\mu}_j e^{i\hat{\omega}_j t} \right) \left( x(t) - \sum_{j=1}^{k} \hat{\mu}_j e^{i\hat{\omega}_j t} \right)^\dagger \quad (7)$$

and $\hat{\mu}_j$ are estimated in form of matrix $\hat{M}_{(k)} = [\hat{\mu}_1, \ldots, \hat{\mu}_k]$ given by:

$$\hat{M}_{(k)} = X \hat{A}_{(k)} (\hat{A}_{(k)}^\dagger \hat{A}_{(k)})^{-1} \quad (8)$$

where $\hat{A}_{(k)} = [a(\hat{\omega}_1), \ldots, a(\hat{\omega}_k)]$.

Dependency of $\hat{Q}_k$ on $\hat{M}_k$ and $\hat{\omega}_{(k)}$, and dependency of $\hat{M}_{(k)}$ on $\hat{A}_{(k)}$ makes $\omega_1, \ldots, \hat{\omega}_k$ the only free parameters in (6) for k≥1, i.e.

$$\ln \mathcal{L}(\hat{\theta}_{(k)}; X) = \ln \mathcal{L}(\hat{\omega}_1, \ldots, \hat{\omega}_k; X). \quad (9)$$

B. Model Order Selection

We consider efficient detection criteria [5] which is given by:

$$\hat{k} = \arg\min_k -\frac{1}{n} \ln \mathcal{L}(\hat{\theta}_{(k)}; X) + kC(n, p) \quad (10)$$

for some model complexity penalty term C(n, p). This can also be represented as sequential generalized likelihood ratio tests [5]:

$$G_k = \frac{1}{n} \ln \left( \frac{\mathcal{L}(\hat{\theta}_{(k+1)}; X)}{\mathcal{L}(\hat{\theta}_{(k)}; X)} \right) \underset{\mathcal{H}_k}{\overset{\mathcal{H}_{k+1}}{\gtrless}} C(n, p) \quad (11)$$

to decide between hypothesis $H_{k+1}$ (k+1 signals) versus $H_k$ (k signals).

Assuming SNR values of all signals above some threshold (which will be discussed later), reliable decisions between $H_j$ and $H_{j+1}$ up to the decision between $H_{k-1}$ and $H_k$ are highly probable (1−ε). Then, we have a decision between $H_k$ and $H_{k+1}$ based on $G_K$ which is asymptotically similar to decision on existence of a signal when only noise is observed. At this point, based on derivation in [8] (note that (31) in [8] lacks a log before the first term), $G_K$ is related to maximum of a random field $\Delta(\omega)$:

$$G_K = -\ln\left(1 - \sup_{\omega \in [0, 2\pi)} \Delta(\omega)\right) \quad (12)$$

which can be written as:

$$\Delta(\omega) = \frac{1}{n^2} a^\dagger(\omega) \Xi^\dagger \hat{Q}^{-1} \Xi a(\omega) \quad (13)$$
$$= \frac{1}{n^2} b^T(\omega) Y^T \sum Y b(\omega)$$

where $b^T = \lfloor \text{Re}\{a^T\}, \text{Im}\{a^T\} \rfloor$, $Y = \text{ReIm}\{\Xi\}$, $\sum = \text{ReIm}\{\hat{Q}^{-1}\}$.

In order to have small probability of overestimating we need to set u such that:

$$Pr[G_K > -\ln(1-u)] = Pr\left[\sup_{\omega \in [0, 2\pi)} \Delta(\omega) > u\right] = \alpha \quad (14)$$

In fact $$C_{EVT}(n,p) = -\ln(1-u) \quad (15)$$

is the desired penalty term in (10) which is yet to be derived using extreme value theory of one dimensional chi-square random fields. Note that $C_{EVT}(n, p) \approx u$ when u is small which is true when n is large.

III. Main Results

A. Approximate Threshold on $\Delta(\omega)$

Theorem 1. An approximation of u to be used in (14) and (15) is given by:

$$u \approx \frac{1}{n}\left(\ln 2n - \ln\alpha + 2p - \frac{5}{2}\right). \quad (16)$$

Proof. Assume n is large enough so that Q can be estimated reliably and therefore whitening process in (13) is perfect. In such conditions, random matrix $\hat{\Xi} \sim CN_{n \times p}(0, I_n \otimes I_p)$ asymptotically $n \gg p$ induces a similar random field $\tilde{\Delta}(\omega)$:

$$\tilde{\Delta}(\omega) = \frac{1}{n^2} a^\dagger(\omega)\hat{\Xi}^\dagger \hat{\Xi} a(\omega) \quad (17)$$

$$= \frac{1}{n^2} b^T(\omega) \tilde{Y}^T \tilde{Y} b(\omega) \leq 1$$

in the sense that $$Pr\left[\sup_{\omega \in [0,2\pi)} \tilde{\Delta}(\omega) > u\right] \approx Pr\left[\sup_{\omega \in [0,2\pi)} \Delta(\omega) > u\right] = \alpha \quad (18)$$

where $$E\left(\frac{1}{n}\Xi\Xi^\dagger\right) = I_n$$

and therefore $$E\left(\frac{1}{2n}\tilde{Y}\tilde{Y}^T\right) = \frac{1}{2}I_{2n}.$$

Now consider $2n\tilde{\Delta}(\omega)$ as sum of squares of 2p IID almost surely continuous stationary unit-variance real Gaussian processes $Z_k(\omega)$ (described in appendix A)

$$2n\tilde{\Delta}(\omega) = \tilde{U}(\omega) = \sum_{l=1}^{2p} Z_l^2(\omega) \quad (19)$$

Since $\tilde{U}(\omega)$ is a one-dimensional Chi-square random field of degrees 2p, its uprising probability is given by [9]:

$$2\pi\sqrt{\frac{\lambda_2}{\pi}}\,(un)^{\frac{2p-1}{2}}\,\frac{e^{-un}}{\Gamma(p)} = \alpha \quad (20)$$

where $$\lambda_2 = \text{Var}\left[\frac{dZ_k(\omega)}{d\omega}\right]$$

(see appendix A). Finally, an approximated solution for (20) is given by (16) and is derived in appendix B.

B. ML Breakdown Threshold SNR

Having set $C_{EVT}$, now we need to know how strong the signals should be in order to have small probability $\varepsilon$ of underestimating the model order K, i.e.

$$Pr[G_0 < C_{EVT}] < Pr[G_1 < C_{EVT}] < \ldots < Pr[G_{K-1} < C_{EVT}] \leq \varepsilon \quad (21)$$

In presence of sufficiently strong signals, $\hat{\omega}_1, \ldots, \hat{\omega}_K$ can be reliably estimated and therefore the probability that test (11) fails to detect K signals can be approximated as:

$$Pr[\hat{k} < K \mid \mathcal{H}_{K,strong}] \quad (22)$$

$$\overset{(a)}{\approx} Pr[G_{K-1} < -\ln(1-u)]$$

$$\overset{(b)}{\approx} Pr[\hat{\mu}_K^\dagger(\hat{Q}_K + \hat{\mu}_K\hat{\mu}_K^\dagger)^{-1}\hat{\mu}_K < u]$$

$$\overset{(c)}{\approx} Pr[\hat{\mu}_K^\dagger(Q + \mu_K\mu_K^\dagger)^{-1}\hat{\mu}_K < u]$$

$$\overset{(d)}{\underset{as\,n\to\infty}{\approx}} Pr\left[\frac{\hat{\mu}_K^\dagger Q^{-1}\hat{\mu}_K}{1 + snr_K} < u\right] = \varepsilon \ll 1$$

where (a) is valid when we choose small $\varepsilon$ which means that left probabilities in (21) (before $G_{K-1}$) are powers of $\varepsilon$ and therefore negligible. Derivation of (b) relies on the same basis as (12) except that sup $\Delta(\omega)$ happens with high probability at $\hat{\omega}_K$ which is assumed to be reliably estimated. (c) relies on reliability of estimates of sample correlation matrix and (d) is based on Sherman-Morrison formula in appendix C assuming SNR is small. In order to have all this happening, SNR is required to be above some threshold which is not large and yet to be derived.

Theorem 2. An approximated threshold signal to noise ratio (ML breakdown SNR) $snr_{th}$ is the solution of:

$$1 - Q_p(\sqrt{2n \cdot snr_{th}}, \sqrt{2nu(1+snr_{th})}) = \varepsilon \quad (23)$$

where $Q_p(a,b)$ is Generalized Marcum Q function given by:

$$Q_p(a,b) = \frac{1}{a^{p-1}}\int_b^\infty x^n e^{-\frac{x^2+a^2}{2}} I_{p-1}(ax)dx \quad (24)$$

Proof. Term $\hat{\mu}_K^\dagger Q^{-1}\hat{\mu}_K$ in (22) can be approximated using a non-central chi-square random variable [10] f with 2p degrees of freedom and non-centrality parameter $2n \cdot snr_K$, i.e. $f \sim \chi_{2p}^2(2n \cdot snr_K)$, therefore at $snr_K = snr_{th}$ $$Pr\left[\frac{\hat{\mu}_K^\dagger Q^{-1}\hat{\mu}_K}{1 + snr_{th}} < u\right] \approx Pr\left[\frac{\frac{1}{2n}f}{1 + snr_{th}} < u\right] = \varepsilon \quad (25)$$

Thus, in order to find $snr_{th}$ in (25) one needs to invert the non-central Chi-square cumulative distribution function (CDF) of f at point $x = 2nu(1+snr_{th})$ which leads to (23).

Figure 15:
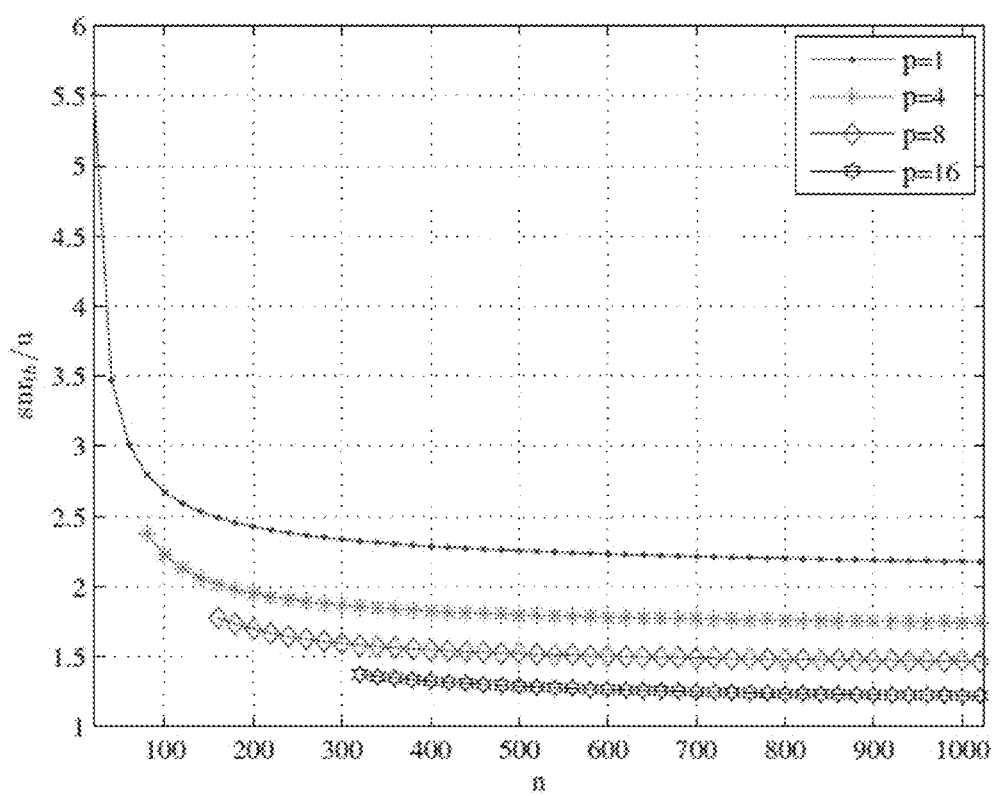
FIG. 15: Ratio $snr_{th}/u$ as a function of n for p=1, 4, 8, 16.

FIG. 15: Ratio $snr_{th}/u$ as a function of n for p=1, 4, 8, 16. For $\varepsilon = \alpha = 0.01$ and practical values of K, p and n, numerically calculated values of $snr_{th}/u$ are plotted in FIG. 15. As can be seen in this plot, in order to numerically solve (23) one can seek values between u and 5u.

TABLE I

PENALTY TERMS AS A FUNCTION OF DIMENSION
WHEN NUMBER OF SAMPLES n IS LARGE

| p | EVT($\approx$u) | MDL | AIC |
|---|---|---|---|
| 1 | $\frac{\ln n + 5.5}{n}$ | $\frac{1.5 \ln n}{n}$ | $\frac{3}{n}$ |
| 16 | $\frac{\ln n + 35.5}{n}$ | $\frac{16.5 \ln n}{n}$ | $\frac{33}{n}$ |

IV. Simulations

In this section we numerically present the detection performance of the proposed model order selection rule as well as threshold SNR for reliable ML estimation in presence of unknown colored noise. In all cases for each experiment we chose random noise covariance matrix such that det(Q)=1 and the ratio of largest to smallest eigenvalue is p. Mean vectors also have different random amplitude and phase in each experiment and are regularized to provide SNR values which are defined based on the noise covariance that is used.

A. Comparison to MDL and AIC

Here we compare probability of detection $P_d = \Pr[\hat{k}=K]$ of the model order selection rules defined by (10) when we use different penalty terms. For this comparison, we compare the new penalty term with AIC [2] and MDL [3] rules:

$$C_{MDL}(n, p) = \frac{(p+1/2)\ln n}{n} \quad (26)$$

$$C_{AIC}(n, p) = \frac{2p+1}{n} \quad (27)$$

The new penalty term as given by (15), (16) is:

$$C_{EVT}(n, p) = -\ln\left(1 - \frac{\ln 2n - \ln\alpha + 2p - 5/2}{n}\right) \quad (28)$$

Figure 16:
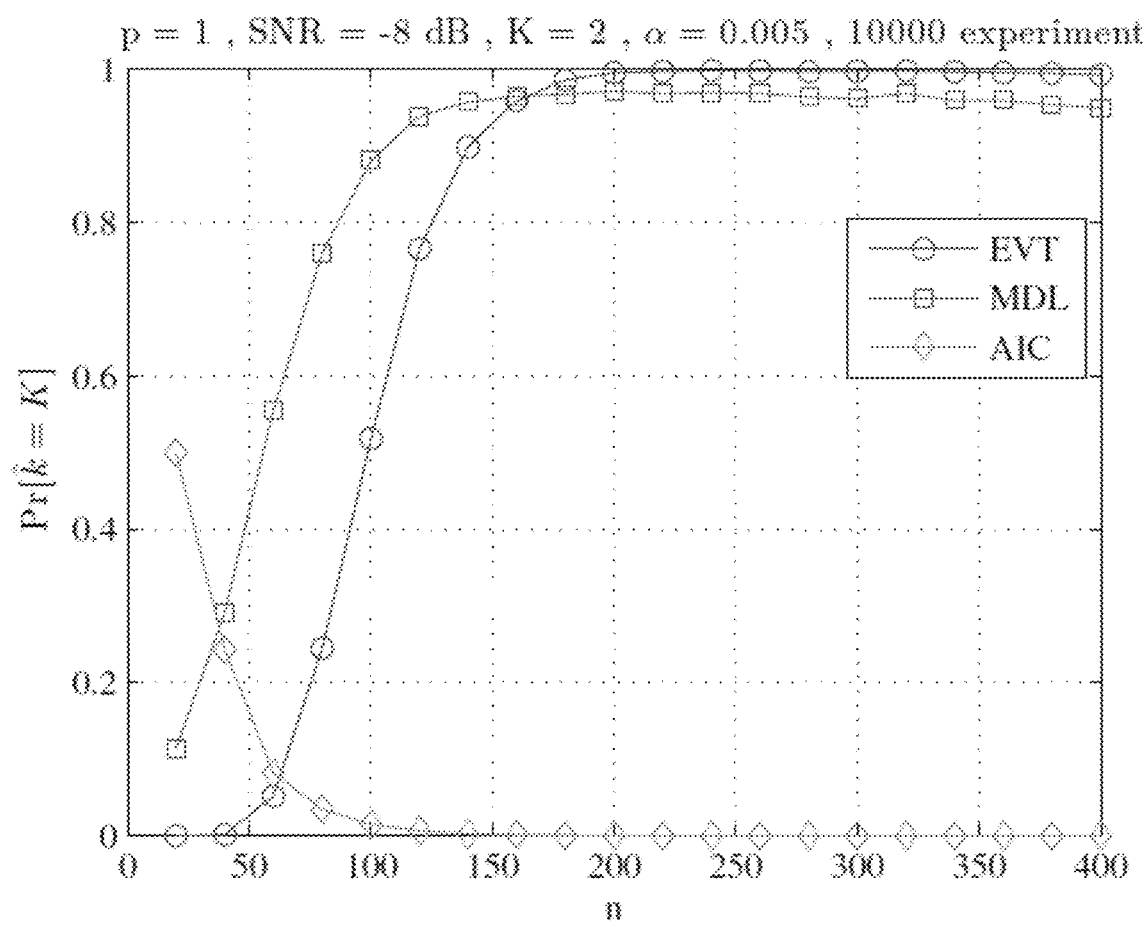
FIG. 16: Probability of detection of the EVT, MDP and AIC as a function of number of observations n vectors with dimension p=1 for K=2 sinusoids with $snr_1=snr_2=SNR$.
Figure 17:
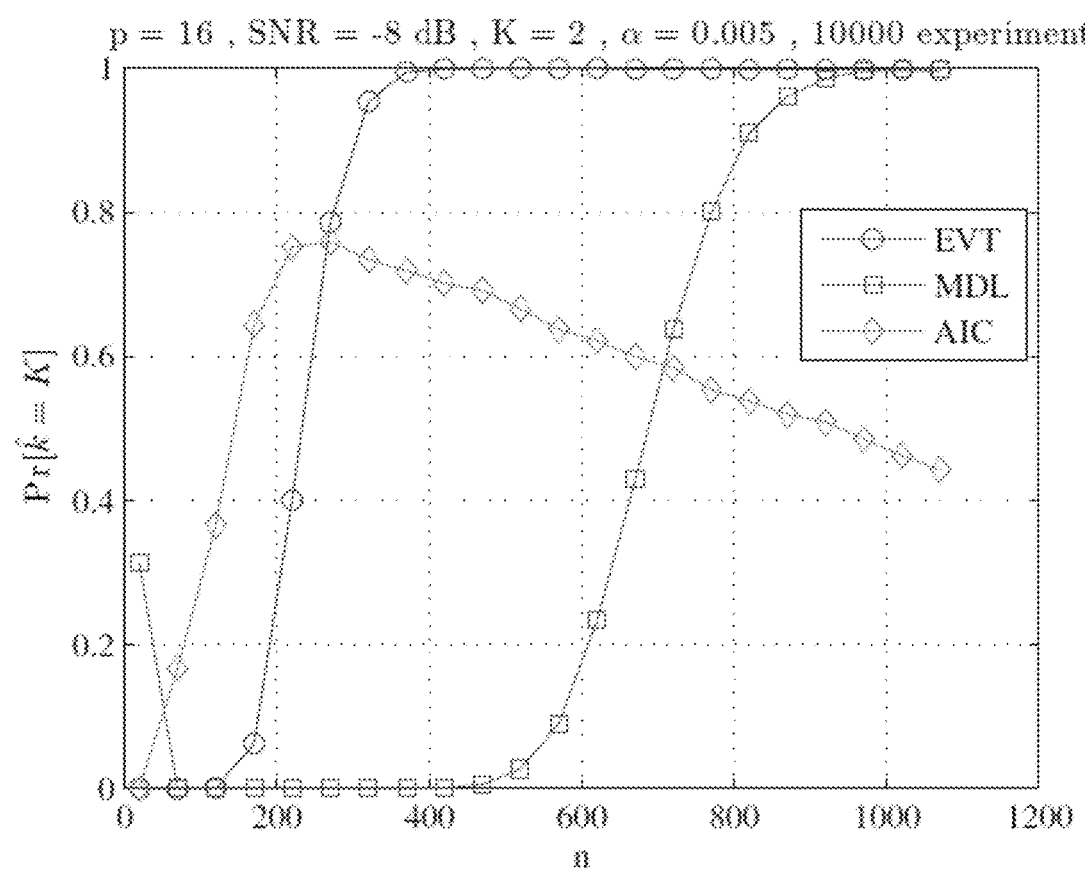
FIG. 17: Probability of detection of the EVT, MDP and AIC as a function of number of observations n vectors with dimension p=16 for K=2 sinusoids with $snr_1=snr_2=SNR$.

FIG. 16: Probability of detection of the EVT, MDP and AIC as a function of number of observations n vectors with dimension p=1 for K=2 sinusoids with $snr_1=snr_2=$SNR. FIG. 17: Probability of detection of the EVT, MDP and AIC as a function of number of observations n vectors with dimension p=16 for K=2 sinusoids with $snr_1=snr_2=$SNR. FIGS. 16 and 17 show detection performance of EVT, MDL and AIC model selection rules for the case of K=2 sinusoids with well-separated frequencies where observations are p=1 and p=16 dimensional vectors. We have used approximated likelihood function for the model selection however the effect of the approximation is negligible when different penalty terms are compared. It can be seen that EVT performs well in both cases while for lower dimension vectors MDL has a similar penalty value (see table I) and therefore similar performance. However, even for case p=1 where MDL performs close to EVT it has a non-negligible probability of oversetting K since its penalty term is less than EVT for $n<e^{11}$. For case p=16 MDL has much higher penalty term than EVT and therefore its required number of samples are much higher than EVT. AIC does not seem to perform well in either case.

B. Threshold SNR

Figure 18:
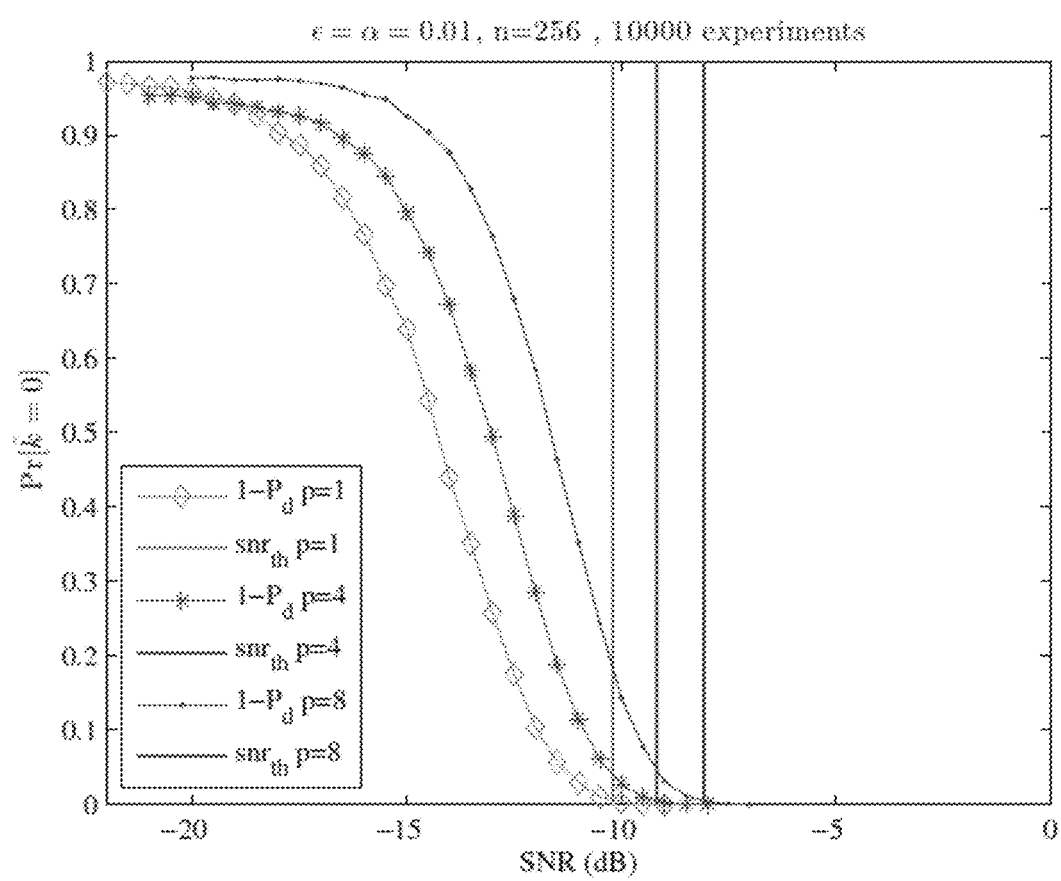
FIG. 18: ML breakdown threshold SNR for K=1 sinusoids, n=256 observations and different vector dimensions p.
Figure 19:
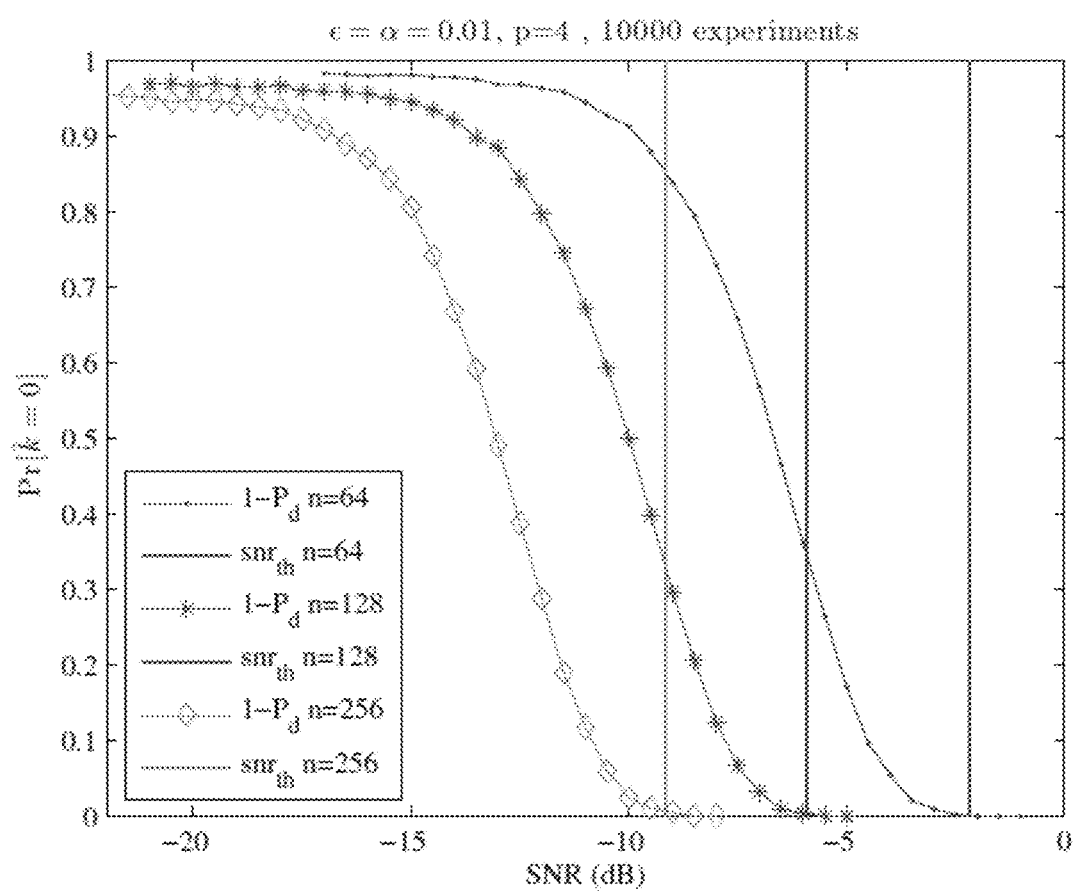
FIG. 19: ML breakdown threshold SNR for K=1 sinusoids, vector dimension p=4 and different number of observations n.

FIG. 18: ML breakdown threshold SNR for K=1 sinusoids, n=256 observations and different vector dimensions p. FIG. 19: ML breakdown threshold SNR for K=1 sinusoids, vector dimension p $\approx$ 4 and different number of observations n. ML breakdown threshold SNR (solution of (23)) is shown in FIGS. 18 and 19 for fixed number of observations and fixed vector dimension respectively. It can be seen that it very accurately predicts the SNR point at which $1-P_d$ (the probability that we underestimate the model order, i.e. not detecting enough number of signals) is negligible.

V. Conclusion

We presented a new penalty term for model selection (detection of number of sinusoids) in presence of unknown colored noise. We also provided the threshold SNR at which model selection, rules start to perform well. Both results are validated by numerical simulations.

Section 4: Model Order Selection for Complex Sinusoids in the Presence of Unknown Correlated Gaussian Noise We consider the problem of detecting and estimating the amplitudes and frequencies of an unknown number of complex sinusoids based on noisy observations from an unstructured array. In parametric detection problems like this, information theoretic criteria such as minimum description length (MDL) and Akaike information criterion (AIC) have previously been used for joint detection and estimation. In our paper, model selection based on extreme value theory (EVT), which has previously been used for enumerating real sinusoidal components from one-dimensional observations, is generalized to the case of multidimensional complex observations in the presence of noise with an unknown spatial correlation matrix. Unlike the previous work, the likelihood ratios considered in the multidimensional case cannot be addressed using Gaussian random fields. Instead, chi-square random fields associated with the generalized likelihood ratio test are encountered and EVT is used, to analyze the model order overestimation probability for a general class of likelihood penalty terms including MDL and AIC, and a novel likelihood penalty term derived based on EVT. Since the exact EVT penalty term involves a Lambert-W function, an approximate penalty term is also derived that is more tractable. We provide threshold signal-to-noise ratios (SNRs) and show that the model order underestimation probability is asymptotically vanishing for EVT and MDL. We also show that MDL and EVT are asymptotically consistent while AIC is not, and that with finite samples, the detection performance of EVT outperforms MDL and AIC. Finally, the accuracy of the derived threshold SNRs is also demonstrated.

I. Introduction

MODEL order selection, in the form of enumerating sinusoidal components in the presence of additive noise, is a fundamental problem in statistical signal processing and time series analysis. A classical approach toward the solution is to study the significance of peaks in the classical periodogram (also called Schuster's periodogram [1]) which is the magnitude of the Fourier transform. Fisher's method [2] to test the significance of peaks for a single sinusoid in data was found to be very conservative when applied to data containing multiple sinusoidal components [3]. A more modern treatment of the significance of peaks in the classical periodogram can be found in [4],[5, (4.2),(4.5)]. Due to its simple form, the classical periodogram facilitates computation but is inferior to joint estimation techniques, especially when multiple sinusoids are contained in the observations [6, pp. 413].

The Lomb-Scargle periodogram [7], [8] is another periodogram method whose peak significance evaluation techniques for single and multiple sinusoids are typically used in scenarios involving non-uniformly sampled data [9], [10]. When the time-series data are uniformly sampled, the Lomb-Scargle techniques reduces to the classical periodogram [8, pp. 839]. It is known that when number of samples is small or the SNR is low, joint ML estimation provides superior results in comparison to other techniques [6, pp. 413], [11], [12] although ML estimation requires high computational complexity [6, pp. 411]. Therefore, joint ML estimation of signals and the noise covariance matrix [13] is employed in this paper because of its performance. In practice, the main challenge in realizing the benefits of ML estimation in the finite-sample case is to find the model order or the right number of sinusoids to be estimated.

Classically, regardless of the estimation technique that is used, estimation and detection (or enumeration) tasks have been performed separately (see [12] and references therein). However, joint detection-estimation techniques, such as Efficient Detection Criterion (EDC)[14] have been advanced that combine ML estimation and model order selection. EDC is based on penalizing the log-likelihood function of ML estimates for different model orders and then selecting the model order with the most penalized log-likelihood value. Certain properties such as asymptotic consistency have been proven for EDC, for example, [15] proves the consistency of EDC for scalar data and known noise variance. Also, within the EDC framework, different penalty terms such as Rissanen's Minimum Description Length (MDL) [16], or Maximum A Posteriori (MAP) [17] can be used. Moreover, the Akaike Information Criterion (AIC) [18] has also been used successfully for some finite sample problems [19] although it does not satisfy the asymptotic consistency requirements of EDC [12, (13)]. Asymptotic consistency is a favorable property that we investigate in this paper, and it is shown that in finite-sample problems, EDC requirements for asymptotic consistency are sufficient and not necessary (see the discussion in [20, sec. II-B]). The implication of such a conclusion is that if one pursues an optimal approach based on the generalized likelihood ratio test (GLRT) between ML estimates of models of different orders (see [20]) they may find a penalty term that does not exactly satisfy the EDC consistency requirements, but indeed results in consistent model selection with interestingly good performance for finite-sample cases. Based on this, [20] provides a new penalty term based on extreme value theory results on the excursion probability of Gaussian random fields. Such random fields are associated with the optimal GLRT for the sinusoid model selection problem when the observations are scalar. More precisely, [20] shows that for such assumptions, the distribution of the GLRT is related to the distribution of maxima of a two-dimensional Gaussian random field since two parameters, frequency and phase, are needed to be estimated for each successive model order. In the case of complex-valued vector observations that we deal with in, this paper, we show that the GLRT distribution is related to the distribution of maxima of a one dimensional (only frequency dimension) chi-square random field. This is because in a complex-valued problem, once the frequency of the sinusoids are estimated, the relative complex-valued amplitudes contain the phase information. The associated random field is a chisquare random field with 2p degrees of freedom where p is the number of dimensions of the observations vectors (i.e. number of sensors). As a side note, a method of derivation of excursion probability of smooth random fields using moments is called the "Rice method" [21], [22] after work of Rice [23] which is used in [24] to derive the excursion probability of one-dimensional chi-square random fields. Further discussion on this topic can be found in [25].

Our treatment of the model selection for complex-valued sinusoidal components considers multiple sensors (vector observations) within vector noise with an unknown correlation matrix while most of the literature deals with problems involving a single sensor (and usually real-valued observations) [12], [15], [17], [26], [27], [20]. References that consider multi-sensor observations often assume spatially white noise [28], [29]. Also, references that employ non-parametric multidimensional approaches usually require that the number of sensors exceeds the number of signals to be estimated [30], [31], [32]. The contributions of this paper are as follows: We derive the properties of the components comprising the random field associated with the GLRT between ML estimates of successive model orders. We prove that for the case of complex sinusoids observed with p sensors, a one-dimensional chisquare random field with 2p degrees of freedom results from GLRT. Also, based on this result, we derive the model order over-estimation (false-alarm) probability, and by inverting the false-alarm probability formula we derive a novel model selection penalty term to achieve a certain false-alarm rate. Also, threshold SNRs needed for reliable model order selection are derived. With the penalty term set a priori, we show that a threshold SNR exists above which the probability of model order underestimation converges to zero as the number of samples approaches infinity. Again, based on the derived false alarm probability formulation, we can incorporate penalty terms of the AIC and MDL criteria and study their detection performance. In brief, we show that for n samples from p sensors, our closed form penalty term, which in its complete form involves the Lambert W function, can be written as $$\frac{\ln 2n - \ln \alpha + p - c_0 + \left(p - \frac{1}{2}\right)\ln\left(2 + \frac{\ln 2n - \ln \alpha}{p - \frac{1}{2}}\right)}{n} \quad (1)$$

for low values of p where c0 is a constant. Note that AIC and MDL penalty terms have forms of $$\frac{2p}{n} \text{ and } \frac{\left(p + \frac{1}{2}\right)\ln n}{n}$$

respectively and a previous EVT-based model order selection rule derived in [20] for one-dimensional (p=1) real-valued observations has form $$\frac{\ln(n/a) + \ln \ln n}{n}.$$

As can be seen, the previous EVT-based penalty term is similar to our penalty term when p=1 and provides similar results in the case of p=1 which is discussed further in the paper.

The problem being considered has practical application in a number of disciplines. In the area of multi-input multioutput (MIMO) communications, authors have encountered the model, order selection problem, where line-of-sight rays and specular reflections are enumerated to accurately model multipath in multi-polarized MIMO channels [33]. For this particular problem, the sensor array is heterogeneous (due to the sensor antenna polarizations) and the correlation matrix of the non-line-of-sight part of the channel response is not known but needs to be estimated. Therefore, it is convenient to consider an unstructured array model (see [34]), which is appropriate for multi-polarized or non-identical sensors in general. The problem of detecting sinusoids in unknown noise is encountered not only in MIMO channel modeling, but also in a broad range of disciplines, such as radar sensing [34], practical astronomy [10], spectrum sensing [35], and spectral analysis of ElectroEncephaloGraphic (EEG) signals [36], [37]. In many cases, the background noise is not spatially white, for example, the background activities of the brain act as correlated noise in EEG signal recordings [38]. Therefore, our contributions can likely be applied in a wide range of disciplines.

The remainder of the paper is organized as follows. Section II describes the problem of enumerating complex sinusoids based on the outputs from an array of sensors, and provides ML estimates of the frequencies and amplitudes as well as the corresponding noise covariance matrix. Section III describes the model selection mechanism, the EVT penalty term, the model order overestimation and underestimation probabilities, and the threshold SNR. Section IV provides an asymptotic analysis of EVT, MDL and AIC. Section V provides numerical simulation results, and finally, Section VI concludes the paper.

Throughout this paper, C represents the complex number field, Re$\{\bullet\}$ and Im$\{\bullet\}$ represent the real and imaginary parts, $(\bullet)^\dagger$ represents conjugate-transpose, $(\bullet)^T$ represents transpose, $(\bullet)^*$ represents complex-conjugate, and $i=\sqrt{-1}$. Also, $\hat{\theta}$ represents an estimate of parameter $\theta$. The notation $\sim$ signifies a distribution of a random variable, where CN(m,R) represents the multivariate complex normal distribution with mean m and covariance matrix R, $\chi_d^2$ represents a chi-square distribution with d degrees of freedom and $\chi_d^2(a)$ represents a non-central chi-square distribution with d degrees of freedom and a non-centrality parameter a. Parenthetical indices associated with matrices and vectors (such as $M_{(k)}$) indicate the matrix or vector dimensions depend on the index. The partitioning operator Re Im$\{\bullet\}$ is defined for a matrix A or a vector $\upsilon$ as (see operators $[\bullet]$ and $\{\bullet\}$ in [13, pp. 3-4], also see [39, 15.8]):

$$\text{ReIm}\{A\} = \begin{bmatrix} \text{Re}\{A\} & -\text{Im}\{A\} \\ \text{Im}\{A\} & \text{Re}\{A\} \end{bmatrix} \quad (2)$$

$$\text{ReIm}\{v\} = \begin{bmatrix} \text{Re}\{v\} \\ \text{Im}\{v\} \end{bmatrix}. \quad (3)$$

Finally, the vector $a(\omega)$ is defined as $[e^{-i1\omega}, \ldots, e^{-in\omega}]^T$.

II. Problem Formulation

Consider the following model for noisy observations x(t) of K complex sinusoid signals in an unstructured array of p sensors:

$$x(t) = \sum_{j=1}^{K} \mu_j e^{i\omega_j t} + \xi(t), t = 1, \ldots, n \quad (4)$$

where t is discrete time index, n is the number of snapshots, K is number of complex sinusoids, where pit is assumed that K<<n, and x, $\mu_j$, $\xi \in C^{p-1}$ for an array of p sensors. We assume that the $\mu_j$ are unknown constant complex-valued amplitude vectors, the $\omega_j$ are distinct unknown frequencies and $\xi$ is temporally white and spatially correlated complex normal noise with distribution CN(0,Q) where Q is its p×p complex non-singular covariance matrix which is not known. Without loss of generality we assume that $\mu_1^\dagger Q^{-1}\mu_1 \geq \ldots \geq \mu_K^\dagger Q^{-1}\mu_K$ where $SNR_j=\mu_j^\dagger Q^{-1}\mu_j$ are referred to as signal SNR values.

Our goal is to estimate the model order K and the associated source parameter $\omega_{(K)}$, $\beta_{(K)}$ as well as the noise covariance matrix Q. We consider a joint detection estimation problem with model order overestimation probability and model order underestimation probability $\epsilon$ to derive an estimate for the model order $\hat{k}$ and an estimate for the parameter vector $\theta_{(\hat{k})}$ such that:

$$Pr[\hat{k}>K]=\alpha \quad (5)$$

$$Pr[\hat{k}<K]=\epsilon \quad (6)$$

where for a candidate model order k we define the parameter vector as:

$$\theta_{(k)} = \begin{cases} [\omega_{(k)}^T, \beta_{(k)}^T, \sigma^T(Q_k)]^T & \text{for } k > 0 \\ \sigma(Q_k) & \text{for } k = 0 \end{cases} \quad (7)$$

in which $$\beta_{(k)}=[Re\{\mu_1^T\},Im\{\mu_1^T\},\ldots,Re\{\mu_k^T\},Im\{\mu_k^T\}]^T \quad (8)$$

and $$\omega_{(k)}=[\omega_1,\ldots,\omega_k]^T \quad (9)$$

represent signal amplitude and frequencies, respectively. Also, $\sigma(\bullet)$ represents any full parameterization of the p×p complex covariance matrix.

Estimating the model order $\hat{k}$ involves estimating the sinusoid frequencies $\omega_j$, the amplitude vectors $\mu_j$ and the noise covariance matrix Q. In collective form, (4) may be written as:

$$X=M_{(K)}A_{\omega_{(K)}}^\dagger+\Xi \quad (10)$$

where X=[x(1), ..., x(n)], $M_{(K)}=[\mu_1, \ldots, \mu_K]$, $A_{\omega_{(K)}}=[a(\omega_1), \ldots, a(\omega_K)]$, and $\Xi=[\xi(1), \ldots, \xi(n)]$.

Assuming a candidate model order k, we define the parametric projection matrices $P_{A_{\omega_{(k)}}}$ and $P_{A_{\omega_{(k)}}}^\perp$ as:

$$P_{A_{\omega_{(k)}}} = A_{\omega_{(k)}}\left(A_{\omega_{(k)}}^\dagger A_{\omega_{(k)}}\right)^{-1} A_{\omega_{(k)}}^\dagger \quad (11)$$

$$P_{A_{\omega_{(k)}}}^\perp = I_n - P_{A_{\omega_{(k)}}} \quad (12)$$

which correspond to projections onto the signal space and the noise space, respectively.

For a candidate model order k, maximization of the log-likelihood function can be written in nested optimization form:

$$\ln \mathcal{L}(\hat{\theta}_{(k)}; X) = \max_{\omega_{(k)}} \max_{M_{(k)}, Q_{(k)}} \ln \mathcal{L}(\theta_{(k)}; X) = \quad (13)$$

$$\max_{\omega_{(k)}} \mathcal{L}_\omega(\omega_{(k)}; X) \stackrel{(a)}{=} \max_{\omega_{(k)}} \left( -np\ln\pi - n\ln\det\left(\frac{1}{n} X P^\perp_{A_{\omega_{(k)}}} X^\dagger\right) - np \right)$$

where L represents the likelihood function and (a) corresponds to a non-parametric joint ML estimation of the mean and covariance [13, (4.1)]. The optimization in (a) is a highly non-linear problem (solved approximately) that yields $\omega_{(k)}$. The noise and signal parameters can then be derived as [13, Theorem 4.2]:

$$\hat{Q}_k = \frac{1}{n} X P^\perp_{A_{\hat{\omega}_{(k)}}} X^\dagger \quad (14)$$

$$\hat{M}_{(k)} = X A_{\hat{\omega}_{(k)}} \left( A^\dagger_{\hat{\omega}_{(k)}} A_{\hat{\omega}_{(k)}} \right)^{-1} \quad (15)$$

where (14) can also be written as:

$$\hat{Q}_k = \frac{1}{n} \sum_{t=1}^n \left( x(t) - \sum_{j=1}^k \hat{\mu}_j e^{i\omega_j t} \right) \left( x(t) - \sum_{j=1}^k \hat{\mu}_j e^{i\omega_j t} \right)^\dagger \quad (16)$$

since $$\hat{M}_{(k)} A^\dagger_{\hat{\omega}_{(k)}} = X P_{A_{\hat{\omega}_{(k)}}}. \quad (17)$$

III. Main Results
A. Model Order Selection Mechanism

We consider an efficient detection criterion [20] given by:

$$\hat{k} = \arg\min_k -\frac{1}{n} \ln \mathcal{L}(\hat{\theta}_{(k)}; X) + kC(n, p) \text{ for } k \in \{0, 1, \ldots\} \quad (18)$$

for some penalty term $C(n, p)$. This can also be represented as a sequential generalized likelihood ratio test [20]:

$$G_k = \frac{1}{n} \ln\left( \frac{\mathcal{L}(\hat{\theta}_{(k+1)}; X)}{\mathcal{L}(\hat{\theta}_{(k)}; X)} \right) \underset{\mathcal{H}_k}{\overset{\mathcal{H}_{k+1}}{\gtreqless}} C(n, p), \quad (19)$$

$$k = 0, 1, \ldots$$

to decide between hypothesis $H_{k+1}$ (k+1 signals) versus $H_k$ (k signals) and stop at the smallest k at which $H_k$ prevails in the test.

Let us assume that the SNR values of all signals are above some threshold (which will be discussed later). Then, reliable decisions between $H_k$ and $H_{k+1}$ up to the decision between $H_{K-1}$ and $H_K$ are highly probable, with probability $1-\varepsilon$ (which will be discussed later). After that, a decision between $H_K$ and $H_{K+1}$ must be made. For both $H_K$ and $H_{K+1}$, by the asymptotic consistency of the ML estimator (for $H_K$) or by considering appendix A (for $H_{K+1}$), all K sinusoids will be estimated reliably in both cases. Therefore, $\hat{Q}_K$ will only depend on the noise (see (16)) and therefore the decision between $H_K$ and $H_{K+1}$ is similar to the detection of a sinusoid when only noise exists. At this point, based on the derivation in [34] (note that [34, (31)] lacks a ln before the first term), $G_{k=K}$ is given by:

$$G_K = -\ln\left( -\sup_{\omega \in [-\pi, \pi)} \Delta(\omega) \right) \quad (20)$$

which relates the generalized likelihood ratio test to the maxima of a random field $\Delta(\omega)$ given by:

$$\Delta(\omega) = \frac{1}{n^2} a^\dagger(\omega) \hat{\Xi}^\dagger \hat{Q}_K^{-1} \hat{\Xi} a(\omega) \quad (21)$$

where later we show that $\Delta(\omega)$ is asymptotically a chi-square random field with 2p degrees of freedom.

Now, in order to have small, overestimation probability ($\alpha$), the threshold u should be set such that:

$$Pr[G_K > -\ln(1-u)] = Pr\left[ \sup_{\omega \in [-\pi, \pi)} \Delta(\omega) > u \right] = \alpha. \quad (22)$$

Since we have $\Delta(\omega) \ll 1$ it is clear that $u < 1$ for $\alpha < 1$. In fact, for arbitrarily small $\alpha$ $$C_{EVT}(n, p) = -\ln(1-u) \quad (23)$$

which is the desired penalty term to be used in (18) and (19) and which remains to be derived. Note that $C_{EVT}(n, p) = u$ $(1 + O(u))$ (by Taylor's expansion) when u is much smaller than 1 which is true when n is large.

B. Probability of Model Order Overestimation

Theorem 1. The probability of model order overestimation (i.e. probability of false alarm) for the test in (19) for any penalty term $C_{EVT}(n, p) = -\ln(1-u)$ that satisfies $nu \to \infty$ and $0 < u < 1$ as $n \to \infty$ is given by:

$$\alpha = 2\pi \sqrt{\frac{\lambda_2}{\pi}} (nu)^{\frac{2p-1}{2}} \frac{e^{-nu}}{\Gamma(p)} \left( 1 + O\left( \frac{1}{n\sqrt{nu}} \right) \right) \quad (24)$$

$$= 2n(nu)^{p-\frac{1}{2}} \frac{e^{-nu}}{\Gamma(p)} \left( 1 + O\left( \frac{1}{\sqrt{n}} \right) + O\left( \frac{1}{n\sqrt{nu}} \right) \right)$$

where $$\lambda_2 = \frac{(n+1)(2n+1)}{6}$$

is the variance of the derivative of the random processes $Z_i(\omega)$ composing the associated $\chi^2$ random field $\tilde{U}(\omega)$ defined in the proof.

Proof. Assume n is large such that $$\sqrt{\frac{p}{n}} \ll 1$$

Under such conditions, using the results of Appendix B, the random matrix $\hat{\Xi} \sim CN_{p \times n}(0, I_p \otimes I_n)$ induces a similar random field $\tilde{\Delta}(\omega)$:

$$\tilde{\Delta}(\omega) = \frac{1}{n^2} a^\dagger(\omega) \hat{\Xi}^\dagger \hat{\Xi} a(\omega) \quad (25)$$

in the sense that $$Pr\left[\sup_{\omega\in[-\pi,\pi)} \tilde{\Delta}(\omega)\left(1 + O\left(\sqrt{\frac{p}{n}}\right)\right) > u\right] = Pr\left[\sup_{\omega\in[-\pi,\pi)} \tilde{\Delta}(\omega) > u\right] = \alpha. \quad (26)$$

The random field derived in (25) can also be generated by:

$$\tilde{\Delta}(\omega) = \frac{1}{n^2} b^T(\omega) \hat{Y}^T \hat{Y} b(\omega) \quad (27)$$

where $b^T(\omega) = \text{Re Im}\{a(\omega)\}^T$ and $\hat{Y} = \text{Re Im}\{\Xi\}$. Now consider $2n\tilde{\Delta}(\omega)$ as the sum of the squares of $2p$ independent identically distributed stationary unit variance real Gaussian processes $Z_k(\omega)$ (described in appendix C):

$$2n\tilde{\Delta}(\omega) = \tilde{U}(\omega) = \sum_{l=1}^{2p} Z_l^2(\omega) \quad (28)$$

Since $\tilde{U}(\omega)$ is a one-dimensional chi-square random field with $2p$ degrees of freedom, its excursion probability for any value of $2nu > 0$ is upper bounded by:

$$Pr\left[\sup_{\omega\in[-\pi,\pi)} \tilde{\Delta}(\omega) > u\right] = Pr\left[\sup_{\omega\in[-\pi,\pi)} \tilde{U}(\omega) > 2nu\right] \overset{(a)}{\leq}$$

$$2\pi\sqrt{\frac{\lambda_2}{\pi}}(nu)^{\frac{2p-1}{2}} \frac{e^{-nu}}{\Gamma(p)} +$$

$$Pr[\chi_{2p}^2 > 2nu] \quad (29)$$

$$= 2\pi\sqrt{\frac{\lambda_2}{\pi}}(nu)^{\frac{2p-1}{2}} \frac{e^{-nu}}{\Gamma(p)} + Q(p, nu) \quad (30)$$

$$\overset{(b)}{=} 2n(nu)^{p-\frac{1}{2}} \frac{e^{-nu}}{\Gamma(p)}\left(1 + O\left(\frac{1}{\sqrt{n}}\right)\right) +$$

$$(nu)^{p-1} \frac{e^{-nu}}{\Gamma(p)}\left(1 + O\left(\frac{1}{nu}\right)\right) \quad (31)$$

$$= 2n(nu)^{p-\frac{1}{2}} \frac{e^{-nu}}{\Gamma(p)}\left(\begin{array}{l} 1 + O\left(\frac{1}{\sqrt{n}}\right) + \\ O\left(\frac{1}{n\sqrt{nu}}\right) \end{array}\right) \quad (32)$$

where $Q(.,.)$ in (30) represents the upper incomplete gamma function $$Q(p, x) = \frac{1}{\Gamma(p)}\int_x^\infty t^{p-1} e^{-t} dt \quad (33)$$

and $$\lambda^2 = \text{Var}\left[\frac{dZ_k(\omega)}{d\omega}\right]$$

is derived in Appendix C. Note that (a) results from [40, pp. 68] and [24, Theorem 3.1] and is an upper bound on the uprising probability of a one dimensional chi-square random field for any value of $0 < u < 1$. Also, note that each term in (29) and (31) can represent a lower bound on the uprising probability:

$$2\pi\sqrt{\frac{\lambda_2}{\pi}}(nu)^{\frac{2p-1}{2}} \frac{e^{-nu}}{\Gamma(p)} \leq Pr\left[\sup_{\omega\in[-\pi,\pi)} \tilde{U}(\omega) > 2nu\right] \quad (34)$$

$$Q(p, nu) \leq Pr\left[\sup_{\omega\in[-\pi,\pi)} \tilde{U}(\omega) > 2nu\right] \quad (35)$$

which is helpful in the analysis of AIC. Furthermore, (b) is based on $$\lambda^2 = \frac{n^2}{3}\left(1 + O\left(\frac{1}{n}\right)\right)$$

(see appendix C, (76)) and an approximation to the tail probability of a chi-square distribution [41, see 6.5.3 and 6.5.32]. Observe that (31) shows that the second term in (29) is $2n/\sqrt{nu}$ times smaller than the first and therefore we obtain (32).

Corollary 2. EVT Model Complexity Penalty Term

For given $n$, $p$, and $\alpha$, the EVT penalty term is given by:

$$C_{EVT} = -\ln(1 - u_{EVT}) \quad (36)$$

where for the given $\alpha$, $u$ is the solution to (24) and is given by:

$$u_{EVT} = \frac{\frac{1}{2} - p}{n} W_{-1}\left(-\exp\left(\frac{\ln 2n - \ln \alpha + p - c_0}{\frac{1}{2} - p}\right)\right) \quad (37)$$

where an approximate threshold (evaluated later in the paper in FIG. 5 in Appendix D) is given by $u_{EVT,approx}$:

$$u_{EVT,approx.} = \frac{\ln 2n - \ln \alpha + p - c_0 + \left(p - \frac{1}{2}\right)\ln\left(2 + \frac{\ln 2n - \ln \alpha}{p - \frac{1}{2}}\right)}{n} \quad (38)$$

Proof. See appendix D.

Remark 3. Observe that $$\lim_{n\to\infty} u_{EVT} = 0 \text{ but } \lim_{n\to\infty} nu_{EVT} = \infty$$

so that the penalty term in (36) is indeed $C_{EVT} = u_{EVT}(1 + O(u_{EVT}))$ and the false alarm probability in (24) is accurate when $$\frac{1}{n(\ln(2n/\alpha) + p + \ln\ln n)} = o(1).$$

C. Probability of Model Order Underestimation

Having found the penalty term for a small overestimation probability, we now address required SNR levels to achieve small probabilities $\varepsilon$ of model order underestimation.

Theorem 4. Consider a penalty term C(n, k)=u for (18). An SNR threshold, $SNR_{th}$, to achieve a desired small probability of model order underestimation, ε (i.e. probability of misdetection), is the solution to:

$$1-Q_p(\sqrt{2n \cdot SNR_{th}}, \sqrt{2nu(1+SNR_{th})}) = \epsilon \quad (39)$$

where $Q_p(.,.)$ is the Generalized Marcum Q function given by:

$$Q_p(a, b) = \frac{1}{a^{p-1}} \int_b^\infty t^p e^{-\frac{t^2+a^2}{2}} I_{p-1}(at) dt, \quad (40)$$

Proof. Since all signals are stronger than the K-th signal (by definition), then considering tests of the form (19), asymptotically we have:

$$Pr[G_0 < C(n,k)] < \ldots < Pr[G_{K-1} < C(n,k)]. \quad (41)$$

This holds because the probability of not detecting two or more stronger sinusoids is less than the probability of not detecting one of them. In the presence of sufficiently strong signals (say $SNR_K > SNR_{th}$) we desire to have:

$$Pr[G_0 < C(n,k)] < \ldots < Pr[G_{K-1} < C(n,k)] \leq \epsilon. \quad (42)$$

When $\hat{\omega}_K$ (the weakest signal) can be reliably detected with probability 1−ε, the probability that test (19) fails to detect all K signals can be approximated as:

$$Pr[k < K | \mathcal{H}_{K,strong}] \stackrel{(a)}{=} Pr[G_{K-1} < -\ln(1-u)](1+O(\epsilon)) \stackrel{(b)}{=}$$
$$r[\hat{\mu}_K^\dagger (\hat{Q}_K + \hat{\mu}_K \hat{\mu}_K^\dagger)^{-1} \hat{\mu}_K < u](1+O(\epsilon) - O(\alpha)) \stackrel{(c)}{=}$$
$$Pr\left[\hat{\mu}_K^\dagger (Q + \mu_K \mu_K^\dagger)^{-1} \hat{\mu}_K \left(1 + O\left(\sqrt{\frac{p}{n}}\right)\right) < u\right] \cdot (1 + O(\epsilon) - O(\alpha))$$
$$\stackrel{(d)}{\underset{as\ SNR_K \to 0}{=}} Pr\left[\frac{\hat{\mu}_K^\dagger Q^{-1} \hat{\mu}_K}{1+SNR_K}\left(1 + O\left(\sqrt{\frac{p}{n}}\right) + O(SNR_K)\right) <\right.$$
$$\left. u\right](1 + O(\epsilon) - O(\alpha)) = \epsilon << 1 \quad (43)$$

where (a) is valid because the left side probabilities, in (42) (before $G_{K-1}$) are powers of ε and therefore negligible. The validity of (b) relies on the same basis as (20) except that sup $\Delta(\omega)$ occurs with high probability 1−O(α)) at $\hat{\omega}_K$. The validity of (c) relies on the accuracy of the sample correlation matrix estimates and (d) is based on the Sherman-Morrison, formula in Appendix E assuming $SNR_{th} \to 0$ as $n \to \infty$. The last assumption is indeed true for EVT and MDL as we will discuss in Section IV-A.

The quadratic form $\hat{\mu}_K^\dagger Q^{-1} \hat{\mu}_K$ in (43) follows non-central chi-square random variable f with 2p degrees of freedom and non-centrality parameter $2n \cdot SNR_K$ i.e. $f \sim \chi_{2p}^2(2n \cdot SNR_K)$ (see Appendix F). Therefore at $SNR_K = SNR_{th}$ $$Pr\left[\frac{\hat{\mu}_K^\dagger Q^{-1} \hat{\mu}_K}{1+SNR_{th}}\left(1 + O\left(\sqrt{\frac{p}{n}}\right) + O(SNR_{th})\right) < u\right] = Pr\left[\frac{\frac{1}{2n}f}{1+SNR_{th}} < u\right] \quad (44)$$
$$= \epsilon$$

Thus, in order to find $SNR_{th}$ in (44) one needs to invert the non-central chi-square cumulative distribution function (CDF) of f at point $x = 2nu(1+SNR_{th})$ which leads to (39).

IV. Asymptotic Analysis of EVT, MDL and AIC

In this section we consider the asymptotic behavior of EVT as well as MDL [16] and AIC [18] for multidimensional model selection. In the case of scalar model selection, we also compare our results to a previous EVT model selection penalty term [20] derived for scalar real-valued observation given by:

$$C'_{EVT}(n, 1) = \frac{\ln n - \ln\left(\alpha\sqrt{\frac{3}{\pi}}\right) + \frac{1}{2}\ln \ln n}{n}. \quad (45)$$

Penalty terms for MDL and AIC (discarding terms that do not depend on model order in our problem) are given by:

$$C_{MDL}(n, p) = u_{MDL} = \frac{(p+1/2)\ln n}{n} \quad (46)$$

and $$C_{AIC}(n, p) = u_{AIC} = \frac{2p+1}{n}. \quad (47)$$

In section IV-A we show that the probability of model order underestimation for EVT and MDL is asymptotically vanishing with an increasing number of samples. Also, in section IV-B we show that the probability of model order overestimation for EVT and MDL is asymptotically vanishing while for AIC it is an increasing function of the number of samples.

A. Asymptotic Probability of Model Order Underestimation

In (39), let $a=\sqrt{2n \cdot SNR_{th}}$ and $b=\sqrt{2nu(1+SNR_{th})}$. For EVT and MDL, since nu is an increasing function of n, when $1-Q_p(a, b)$ is small we should have a>b, which implies $$SNR_{th} > \frac{u}{1-u}.$$

As u becomes small, we obtain $SNR_{th} > u$ for EVT and MDL.

Now, assume for some $n_0$, p, α, and ε that a solution to (39) (for EVT or MDL) is determined in the form of $SNR_{th} = s_0 u$ for some $s_0 > 1$. From [42, (12)] we adopt the following upper bound (when a>b) for values of $\epsilon_n$ associated with α, p, and increasing values of $n > n_0$:

$$\epsilon_n < \frac{1}{2}\left(e^{-\frac{(a-b)^2}{2}} - e^{-\frac{(a+b)^2}{2}}\right). \quad (48)$$

Since as $n \to \infty$ we have $\sqrt{2nu(1+SNR_{th})} = \sqrt{2nu}(1+O(SNR_{th}))$, we can write $a = \sqrt{s_0} b$ and therefore $$\epsilon_n < \frac{1}{2}\left(e^{-(\sqrt{s_0}-1)^2 nu} - e^{-(\sqrt{s_0}+1)^2 nu}\right) \quad (49)$$

which tends to zero as $n \to \infty$ for EVT and MDL since $s_0 > 1$ and $nu \to \infty$.

B. Asymptotic Probability of Model Order Overestimation

1) EVT: The EVT penalty term (36) is designed to provide a constant false alarm rate. However, as noted in [20], a sequence of $$\alpha_n = \frac{\alpha}{\ln n}$$

provides a weakly consistent estimator ($\alpha_n \to 0$). Note that in this case since the SNR threshold depends on $u_{EVT}$ which itself depends on (see (38)) ln n−ln $\alpha_n$=ln n−ln $\alpha$+ln ln n=ln n+O(ln ln n) as n→∞, the SNR threshold for small probability of model order underestimation is not changed. Thus, with the same threshold SNR and therefore a vanishing probability of model order underestimation, EVT can achieve arbitrary small probabilities of model order overestimation as well. This proves the consistency of EVT.

2) MDL: By inserting $$nu_{MDL} = nC_{MDL}(n, p) = \left(p + \frac{1}{2}\right)\ln n$$

in (24) and taking logarithm from both sides we have:

$$\ln \alpha_{MDL} = \ln 2n + \left(p - \frac{1}{2}\right)\left(\ln \frac{p + \frac{1}{2}}{p - \frac{1}{2}} + \ln \ln n\right) - \left(p + \frac{1}{2}\right)\ln n - c_0 + p - \left(p - \frac{1}{2}\right)\ln\left(p - \frac{1}{2}\right) \quad (50)$$

$$= \left(\frac{1}{2} - p\right)\ln n + O(\ln \ln n) \xrightarrow[as\ n \to \infty]{} -\infty$$

which is derived based on (79) and holds for p≥1. This shows the consistency of the MDL estimator.

TABLE I

PENALTY TERMS AS A FUNCTION OF DIMENSION WHEN NUMBER OF SAMPLES n IS LARGE

| p | EVT (approx. (84)) | EVT ((45) [20]) | MDL | AIC |
|---|---|---|---|---|
| 1 | $\frac{\ln n + 6.5}{n}$ | $\frac{\ln n + 6.2}{n}$ | $\frac{1.5 \ln n}{n}$ | $\frac{3}{n}$ |
| 16 | $\frac{\ln n + 35.5}{n}$ | | $\frac{16.5 \ln n}{n}$ | $\frac{33}{n}$ |

3) AIC: Considering $nu_{AIC}=nC_{AIC}(n, p)=2p+1$ and the fact that the first term in (29) is a lower bound to the probability of overestimation we find that the overestimation probability of AIC is lower bounded as:

$$\ln \alpha_{AIC} > \ln 2n + \left(p - \frac{1}{2}\right)\ln \frac{2p + 1}{p - \frac{1}{2}} + p - c_0 - (2p + 1) \quad (51)$$

where (79) is used in the derivation. This shows that the probability of overestimation for AIC is strictly increasing with the number of samples n and therefore AIC is not consistent.

V. Simulations

In this section we numerically present the detection performance of the proposed model order selection rule for reliable ML estimation in the presence of unknown correlated noise. In each experiment, a random noise covariance matrix is employed such that det(Q)=1. Complex amplitude vectors are assumed to have random phase and amplitudes, where the amplitudes are scaled to provide the desired average SNR values relative to the noise covariance.

Figure 20:
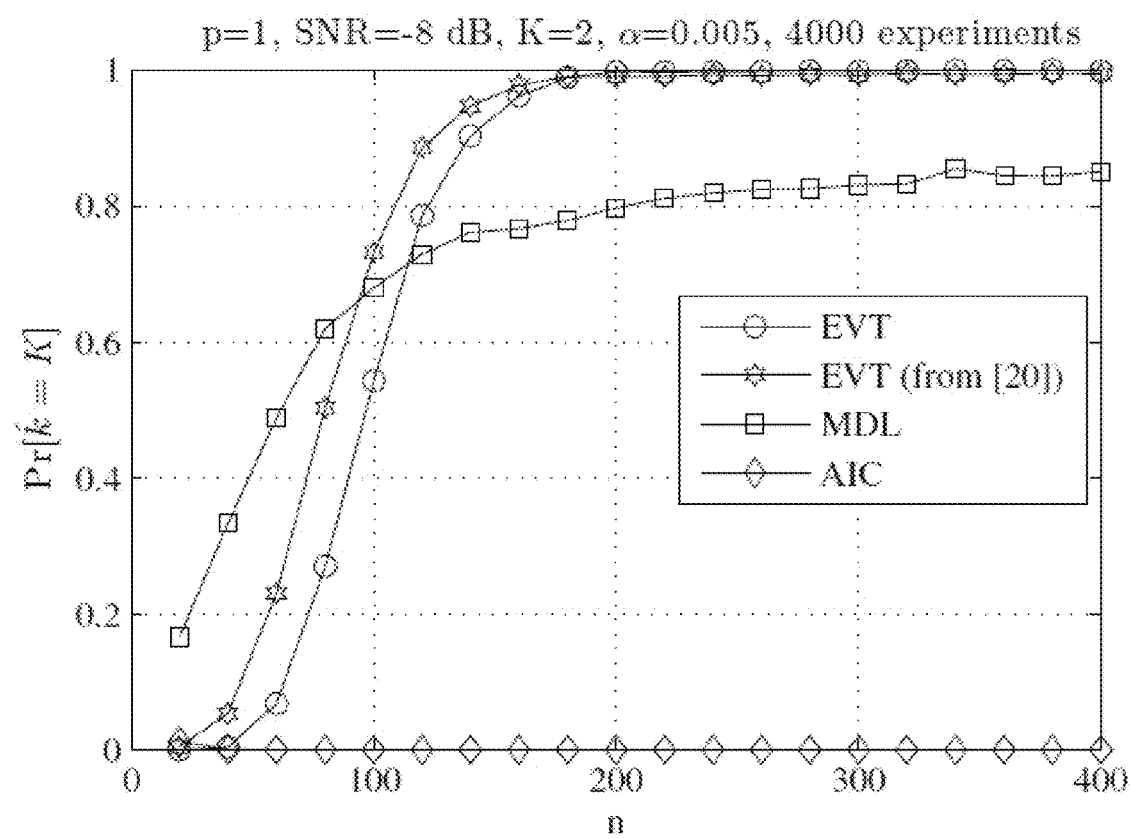
FIG. 20: Probability that the model order is correctly estimated for the EVT, MDL and AIC as a function of number of observations n vectors with dimension p=1 for K=2 sinusoids with $SNR_1=SNR_2=SNR$.
Figure 21:
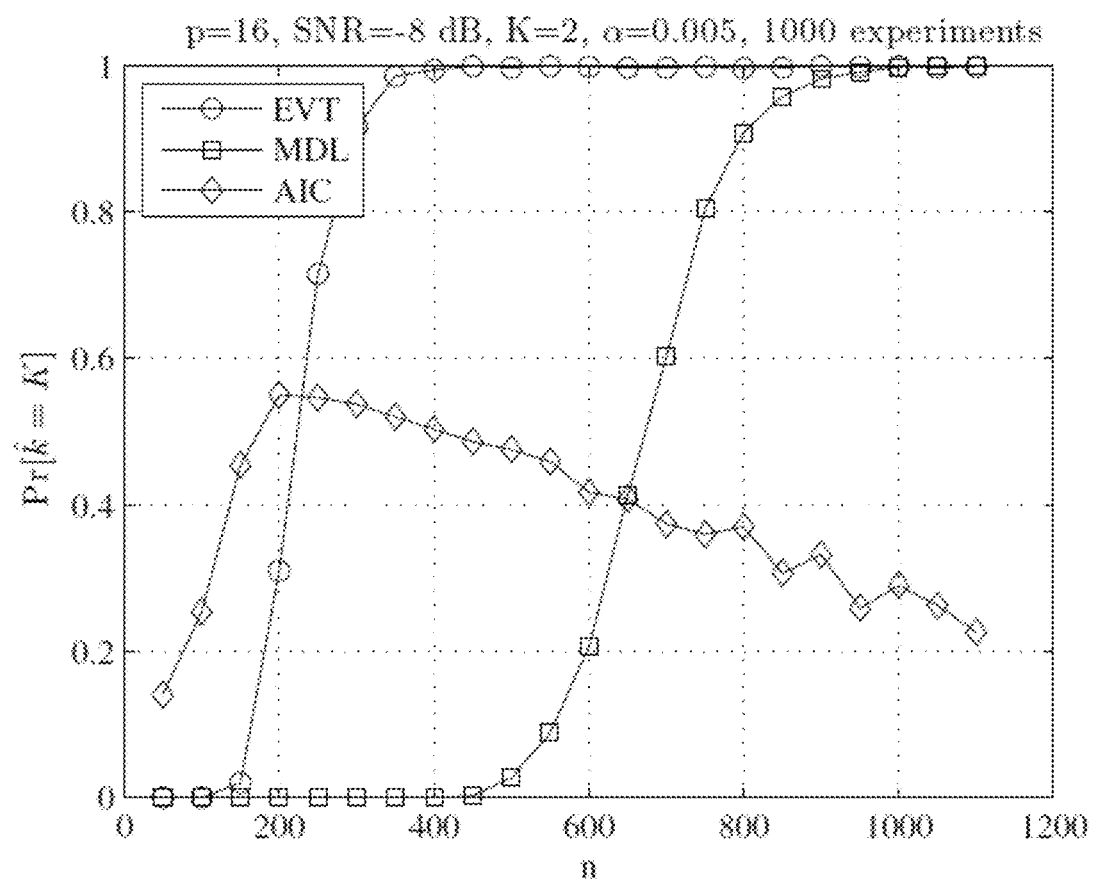
FIG. 21: Probability that the model order is correctly estimated for the EVT, MDL and AIC as a function of number of observations n vectors with dimension p=16 for K=2 sinusoids with $SNR_1=SNR_2=SNR$.

FIG. 20: Probability that the model order is correctly estimated for the EVT, MDL and AIC as a function of number of observations n vectors with dimension p=1 for K=2 sinusoids with $SNR_1$=$SNR_2$=SNR. FIG. 21: Probability that the model order is correctly estimated for the EVT, MDL and AIC as a function of number of observations n vectors with dimension p=16 for K=2 sinusoids with $SNR_1$=$SNR_2$=SNR. FIGS. 20 and 21 show the detection performance of the EVT, MDL and AIC model selection rules for the case of K=2 sinusoids with well-separated frequencies ($\omega_1$=0.4η, $\omega_2$=0.6π) where observations are vectors of length p=1 (a single sensor) and p=16. In the case of p=1 we have also compared our EVT penalty term with the penalty term provided in (45) (see [20]) and as it is expected that they generate similar results shown as in FIG. 20 except that for large values of n our penalty term provides smaller probability of overestimation, i.e. 0.003 versus 0.007 which is difficult to see from the plot (note that the desired probability of overestimation is α=0.005). We have used approximated maximum likelihood estimates for the model selection, where the impact of the approximation is negligible when comparing the different penalty terms. It can be seen that EVT performs well in both cases while for lower dimensions MDL has a similar penalty term (see table I) and therefore similar performance. However, even for case p=1, MDL has a high probability of overestimating K since its penalty term is less than EVT for n<$e^{13}$. For the case p=16, MDL has much higher penalty term than EVT and therefore requires a larger number of samples than EVT. AIC does not perform well in either case.

A. Threshold SNR

Figure 22:
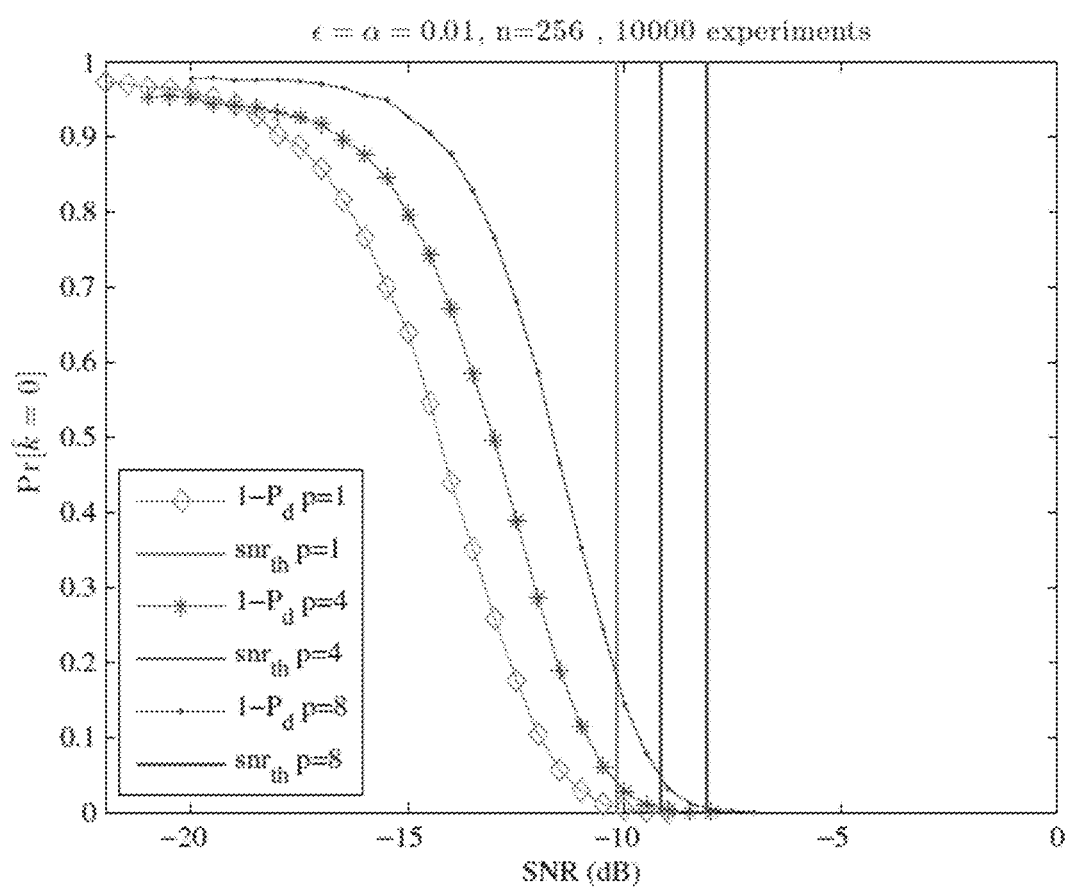
FIG. 22: Accuracy of the derived threshold SNR in predicting the SNR at which model order selection is reliable for K=1 sinusoids, n=256 observations and the number of sensors (p). This figure shows the detection performance behavior versus SNR for different numbers of samples. Each vertical line corresponds to a threshold SNR at which the y-axis value of the related curve should be 0.01, which is seen to be met.
Figure 23:
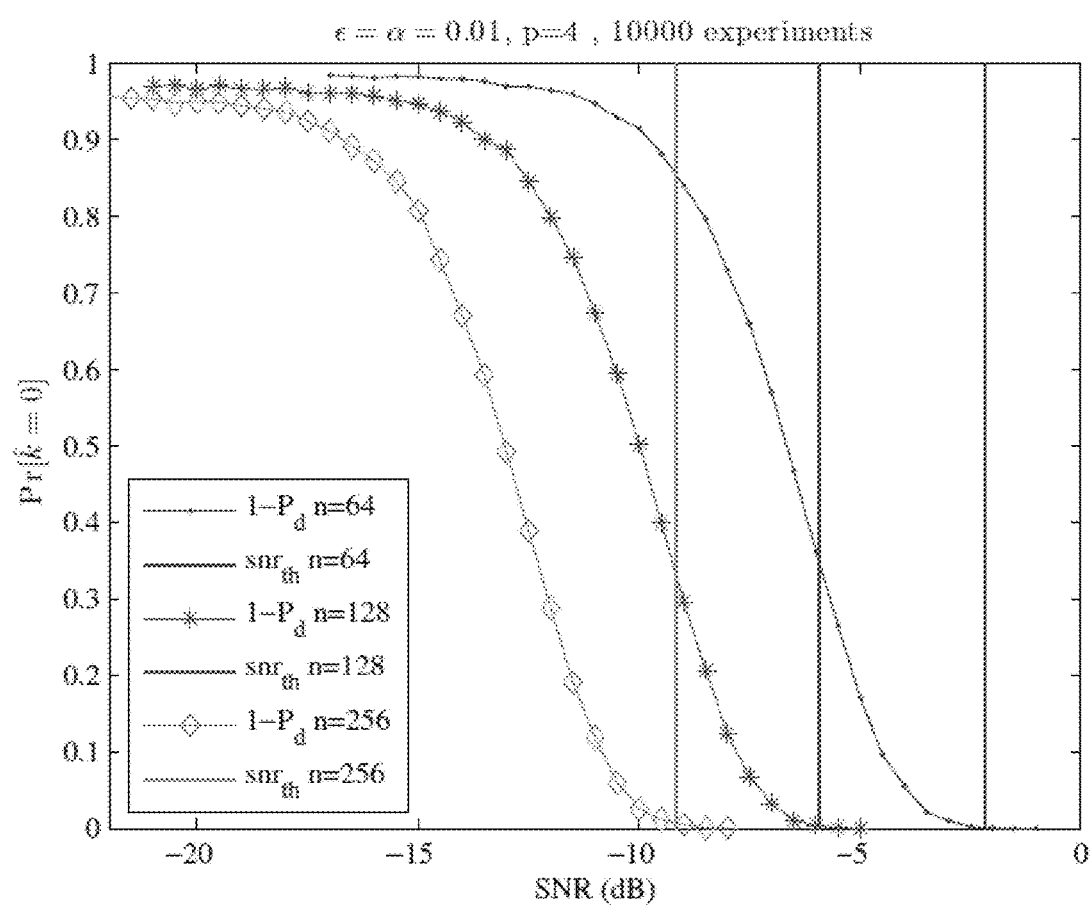
FIG. 23: Accuracy of the derived threshold SNR in predicting the SNR at which model order selection is reliable for K=1 sinusoids, p=4 sensors, and the number of observations (n). This figure shows the detection performance behavior versus SNR for different numbers of samples. Each vertical line corresponds to a threshold SNR at which the y-axis value of the related curve should be 0.01, which is seen to be met.

FIG. 22: Accuracy of the derived threshold SNR in predicting the SNR at which model order selection is reliable for K=1 sinusoids, n=256 observations and the number of sensors (p). This figure shows the detection performance behavior versus SNR for different numbers of samples. Each vertical line corresponds to a threshold SNR at which the y-axis value of the related curve should be 0.01, which is seen to be met. FIG. 23: Accuracy of the derived threshold SNR in predicting the SNR at which model order selection is reliable for K=1 sinusoids, p=4 sensors, and the number of observations (n). This figure shows the detection performance behavior versus SNR for different numbers of samples. Each vertical line corresponds to a threshold SNR at which the y-axis value of the related curve should be 0.01, which is seen to be met. The threshold SNR (the solution of (39) when $u_{EVT}$ is used) is shown in FIGS. 22 and 23 for a fixed number of observations and fixed vector dimensions respectively. It can be seen that it very accurately predicts the SNR point at which 1−$P_d$=1−Pr[k̂=K] (which in this case is the probability that the model order is underestimated) is negligible.

VI. Conclusion

In this work, we have generalized the use of extreme value theory (EVT) to address model order selection and joint parameter estimation associated with the detection of complex-valued sinusoids in the presence of unknown correlated noise, where an unstructured array with p sensors has been assumed. We have derived a log-likelihood penalty term for EVT-based model selection and a simplified form that can be used in general likelihood ratio tests for model order selection. We showed in the special case of scalar observations that our penalty term, although designed for complex-valued observations, provides similar results to the previous EVT-based penalty terms that were derived for real-valued observations. We proved the asymptotic consistency for both the EVT model selection rule as well as for MDL and have shown through simulations that the finite sample size performance of EVT is superior to MDL. Also, AIC was shown to be inconsistent asymptotically, with overestimation probabilities that increase with the sample size. We also derived SNR thresholds at which the EVT and MDL model selection rules perform well, i.e., they yield small probabilities of underestimating the model order.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using a processor. The processor may be communicatively coupled to a memory. A processor can include, for example, a machine that includes computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

A skilled artisan will also appreciate, in light of this disclosure, that multiple distributed computing devices can be substituted for any one computing device illustrated herein. In such distributed embodiments, the functions of the one computing device are distributed such that some functions are performed on, each of the distributed computing devices.

While certain embodiments have been explicitly described, other embodiments will become apparent, to those of ordinary skill in the art based on this disclosure.

Therefore, the scope of the invention is intended to be defined by reference to the claims and not simply with regard to the explicitly described embodiments.

What is claimed is:

1. A method for detection of complex sinusoidal signal components, the method comprising:
   obtaining a set of complex-valued samples of one or more signals, in the presence of unknown noise, using a plurality of sensors;
   assuming the presence of κ candidate complex sinusoidal signal components in the set of complex-valued samples;
   estimating κ candidate complex sinusoidal signal components in the set of complex-valued samples;
   comparing a measurement of the energy of the κ estimated candidate complex sinusoidal signal components with a threshold value; and
   based on the comparison, determining whether to assume a different number of candidate complex sinusoidal signal components and repeat the estimation and the comparison steps, or to specify the estimated κ candidate complex sinusoidal signal components as detected complex sinusoidal signal components,
   wherein the threshold value is determined using a penalty value which reduces the probability of overestimating the number of complex sinusoidal signal components in the set of complex-valued samples.

2. The method of claim 1, wherein the threshold value comprises a threshold signal-to-noise ratio (SNR) value.

3. The method of claim 1, wherein comparing the measurement of the energy of the κ estimated candidate complex sinusoidal signal components with the threshold value comprises determining whether each of the candidate complex sinusoidal signal components has a signal-to-noise ratio that exceeds the threshold value.

4. The method of claim 3, further comprising repeating the estimation and the comparison steps until a SNR value for a candidate complex sinusoidal signal component falls below the threshold value.

5. The method of claim 1, wherein the threshold is determined using extreme value theory (EVT).

6. The method of claim 1, wherein the probability of underestimating the number of complex sinusoidal signal components in the set of complex-valued samples is asymptotically vanishing with an increasing number of samples.

7. The method of claim 1, wherein the probability of overestimating the number of complex sinusoidal signal components in the set of complex-valued samples is asymptotically vanishing with an increasing number of samples.

8. The method of claim 1, wherein estimating κ candidate complex sinusoidal signal components in the set of complex-valued samples comprises using maximum likelihood estimation.

9. The method of claim 1, wherein estimating κ candidate complex sinusoidal signal components in the set of complex-valued samples comprises determining frequency and amplitude values of the κ candidate complex sinusoidal signal components.

10. The method of claim 1, further comprising extracting the detected complex sinusoidal signal components from the set of complex-valued samples of the one or more signals.

11. The method of claim 1, wherein obtaining the set of complex-valued samples comprises identifying a signal path in a multiple-input and multiple-output (MIMO) channel.

12. The method of claim 11, wherein each candidate complex sinusoidal signal component comprises a postulated specular ray for the signal path.

13. The method of claim 1, wherein the set of complex-valued samples comprises a time-varying channel impulse response of a multiple-input and multiple-output (MIMO) channel.

14. The method of claim 1, wherein determining the number of complex sinusoidal signal components present in the set of complex-valued samples comprises determining a model order of a multiple-input and multiple-output (MIMO) channel.

15. The method of claim 14, wherein the penalty value comprises a model order selection penalty value.

16. The method of claim 1, wherein the complex-valued samples comprise measurements of radio waves, and wherein the sensors comprise radio antennas.

17. The method of claim 1, wherein the noise has an unknown correlation matrix.

18. The method of claim 1, wherein the unknown noise comprises colored noise.

19. The method of claim 1, wherein the unknown noise comprises correlated Gaussian noise.

20. A device for detection of complex sinusoidal signal components, the device comprising:
a plurality of sensors; and
a processor configured to perform a method comprising
obtaining a set of complex-valued samples of one or more signals, in the presence of unknown noise, using the plurality of sensors;
assuming the presence of κ candidate complex sinusoidal signal components in the set of complex-valued samples;
estimating κ candidate complex sinusoidal signal components in the set of complex-valued samples;
comparing a measurement of the energy of the κ estimated candidate complex sinusoidal signal components with a threshold value; and
based on the comparison, determining whether to assume a different number of candidate complex sinusoidal signal components and repeat the estimation and the comparison steps, or to specify the estimated κ candidate complex sinusoidal signal components as detected complex sinusoidal signal components,
wherein the threshold value is determined using a penalty value which reduces the probability of overestimating the number of complex sinusoidal signal components in the set of complex-valued samples.

21. A method for detection of complex sinusoidal signal components, the method comprising:
obtaining a set of complex-valued samples of one or more signals, in the presence of unknown noise, using a plurality of sensors;
assuming the presence of κ candidate complex sinusoidal signal components in the set of complex-valued samples;
estimating κ candidate complex sinusoidal signal components in the set of complex-valued samples;
comparing a function defined by a scaled ratio of likelihood functions with a threshold value to determine if at least κ complex sinusoidal signals are present; and
based on the comparison, determining whether to increment the number of candidate complex sinusoidal signal components and repeat the estimation and the comparison steps, or to specify the estimated κ candidate complex sinusoidal signal components as detected complex sinusoidal signal components,
wherein the threshold value is determined using a penalty value which leads to a probability of overestimating the number of complex sinusoidal signal components in the set of complex-valued samples that is about or below a constant false alarm rate.

22. The method of claim 21, wherein SNR values of detected sinusoidal signal components are above a minimum SNR threshold required to achieve a predetermined probability of model order underestimation.

23. The method of claim 21, wherein the threshold is determined using extreme value theory (EVT).

24. The method of claim 21, wherein the probability of underestimating the number of complex sinusoidal signal components in the set of complex-valued samples is asymptotically vanishing with an increasing number of samples.

25. The method of claim 21, wherein the probability of overestimating the number of complex sinusoidal signal components in the set of complex-valued samples is asymptotically vanishing with an increasing number of samples.

26. The method of claim 21, wherein estimating κ candidate complex sinusoidal signal components in the set of complex-valued samples comprises using maximum likelihood estimation.

27. The method of claim 21, wherein estimating κ candidate complex sinusoidal signal components in the set of complex-valued samples comprises determining frequency and amplitude values of the κ candidate complex sinusoidal signal components.

28. The method of claim 21, wherein obtaining the set of complex-valued samples comprises identifying a signal path in a multiple-input and multiple-output (MIMO) channel.

29. The method of claim 28, wherein each candidate complex sinusoidal signal component comprises a postulated specular ray for the signal path.

30. The method of claim 21, wherein the set of complex-valued samples comprises a time-varying channel impulse response of a multiple-input and multiple-output (MIMO) channel.

31. The method of claim 21, wherein determining the number of complex sinusoidal signal components present in the set of complex-valued samples comprises determining a model order of a multiple-input and multiple-output (MIMO) channel.

32. The method of claim 21, wherein the complex-valued samples comprise measurements of radio waves, and wherein the sensors comprise radio antennas.

33. The method of claim 21, wherein the noise has an unknown correlation matrix.

34. The method of claim 21, wherein the unknown noise comprises noise that is at least partially correlated between sensors.

35. The method of claim 21, wherein the unknown noise comprises correlated Gaussian noise.

36. A device for detection of complex sinusoidal signal components, the device comprising:
a plurality of sensors; and
a processor configured to perform a method comprising
obtaining a set of complex-valued samples of one or more signals, in the presence of unknown noise, using a plurality of sensors;
assuming the presence of κ candidate complex sinusoidal signal components in the set of complex-valued samples;
estimating κ candidate complex sinusoidal signal components in the set of complex-valued samples;
comparing a function defined by a scaled ratio of likelihood functions with a threshold value to determine if at least κ complex sinusoidal signals are present; and based on the comparison, determining whether to increment the number of candidate complex sinusoidal signal components and repeat the estimation and the comparison steps, or to specify the estimated κ candidate complex sinusoidal signal components as detected complex sinusoidal signal components, wherein the threshold value is determined using a penalty value which leads to a probability of overestimating the number of complex sinusoidal signal components in the set of complex-valued samples that is about or below a constant false alarm rate.

37. The method of claim 1, wherein κ and associated sinusoid signal component parameters, as well as a noise covariance matrix, are estimated through joint detection, with a model order overestimation probability, alpha, and a model order underestimation probability, epsilon, where alpha can be arbitrarily set between 0 and 1, and where epsilon is related to the threshold value.

* * * * *